United States Patent
Sugar et al.

(10) Patent No.: US 12,375,877 B2
(45) Date of Patent: Jul. 29, 2025

(54) WIRELESS ROOM OCCUPANCY MONITOR

(71) Applicant: Emanate Wireless, Inc., Ijamsville, MD (US)

(72) Inventors: Gary L. Sugar, Shaker Heights, OH (US); Yohannes Tesfai, Silver Spring, MD (US); Chandra Vaidyanathan, Rockville, MD (US); Neil R. Diener, Hudson, OH (US)

(73) Assignee: EMANATE WIRELESS, INC., Ijamsville, MD (US)

( * ) Notice: Subject to any disclaimer, the term of this patent is extended or adjusted under 35 U.S.C. 154(b) by 674 days.

(21) Appl. No.: 17/730,278

(22) Filed: Apr. 27, 2022

(65) Prior Publication Data

US 2022/0369068 A1  Nov. 17, 2022

Related U.S. Application Data

(60) Provisional application No. 63/308,160, filed on Feb. 9, 2022, provisional application No. 63/236,288, filed on Aug. 24, 2021, provisional application No. 63/196,276, filed on Jun. 3, 2021, provisional application No. 63/182,071, filed on Apr. 30, 2021.

(51) Int. Cl.
*H04W 4/029* (2018.01)
*H04W 4/33* (2018.01)
*H04W 4/80* (2018.01)

(52) U.S. Cl.
CPC .......... *H04W 4/029* (2018.02); *H04W 4/33* (2018.02); *H04W 4/80* (2018.02)

(58) Field of Classification Search
CPC ......... H04W 4/029; H04W 4/80; H04W 4/33; H04W 4/02; H04W 4/027
See application file for complete search history.

(56) References Cited

U.S. PATENT DOCUMENTS

| | | | | |
|---|---|---|---|---|
| 6,026,304 A | * | 2/2000 | Hilsenrath | .............. H04W 4/02 455/457 |
| 9,955,316 B2 | * | 4/2018 | Jampani | ................ G06Q 10/109 |
| 10,149,107 B2 | * | 12/2018 | Na | ........................ G01S 5/02585 |
| 11,662,450 B2 | * | 5/2023 | Steiner | .................... G01S 7/415 702/150 |
| 12,153,156 B2 | * | 11/2024 | Ozturk | .................... G01S 7/006 |

(Continued)

*Primary Examiner* — John A Tweel, Jr.
(74) *Attorney, Agent, or Firm* — Edell, Shapiro & Finnan, LLC

(57) ABSTRACT

A wireless room occupancy monitor, system and training method are provided. The room occupancy monitor includes an antenna array configured to detect wireless transmissions from a tag device; a wireless transceiver configured to receive the wireless transmissions detected by the antenna array and produce receive signals; a processor configured to process the receive signals; and a motion sensor coupled to the processor and configured to wake up the processor in response to detecting when the tag device enters or exits a room. The monitor is configured to be mounted proximate an entryway to the room. After the motion sensor wakes up the processor, the processor is configured to power on the wireless transceiver and run an algorithm on a sequence of received signal strength estimates and array response vectors derived from the receive signals to determine when the tag device has entered or exited the room via the entryway.

20 Claims, 24 Drawing Sheets

(56) References Cited

U.S. PATENT DOCUMENTS

| | | |
|---|---|---|
| 12,190,193 B2 * | 1/2025 | Eizenberg .......... G06K 17/0022 |
| 2019/0124475 A1 | 4/2019 | Swart |
| 2021/0306803 A1 | 9/2021 | Swart et al. |
| 2022/0030393 A1 | 1/2022 | Collins |
| 2022/0101715 A1 | 3/2022 | Swart et al. |

* cited by examiner

WIRELESS ROOM OCCUPANCY MONITOR

CROSS-REFERENCE TO RELATED APPLICATIONS

This application claims the benefit of U.S. Provisional Patent Application No. 63/182,071, filed Apr. 30, 2021; U.S. Provisional Patent Application No. 63/196,276, filed Jun. 3, 2021; U.S. Provisional Patent Application No. 63/236,288, filed Aug. 24, 2021; and U.S. Provisional Patent Application No. 63/308,160, filed Feb. 9, 2022, which are incorporated by reference herein in their entirety.

FIELD OF THE INVENTION

The present disclosure relates generally to real-time location systems (RTLSs) and, more specifically, to monitoring systems that can locate active radio-frequency identification (RFID) tags in real-time.

BACKGROUND OF THE INVENTION

There is a strong market need for real-time location systems (RTLSs) that can deliver room-level accuracy. Healthcare automation applications such as those used for hand hygiene enforcement or nurse call cancellation demonstrate this need. For example, when a patient presses a nurse call button in a hospital room, the nurse call corridor lights illuminate, and the nurse may receive a call on his or her wireless phone. When the nurse enters the patient's room, the RTLS automatically detects and records their presence while canceling the call. Obviously, if the RTLS did not very accurately detect that the nurse entered the correct room at the correct time, the RTLS would not be very useful for this application.

There is also a need for RTLS's based on Bluetooth™ Low Energy (BLE) wireless technology. Some advantages of BLE-based RTLSs are lower cost, longer battery life and device portability afforded by the pervasiveness of BLE. As of the time of this writing, however, the state-of-the-art RTLS's that can provide room-level accuracy use infrared (IR) and ultrasound technology to locate the wireless tag devices that they locate. Both IR and ultrasound technologies are non-standardized, costly to deploy and less energy efficient than BLE-only RTLS's. A BLE-based (or more generally, wireless radio frequency (RF)-based) RTLS that can provide room-level accuracy would be quite valuable for current and future location system applications.

SUMMARY OF THE INVENTION

The present disclosure describes a wireless RF-based RTLS that can deliver room-level accuracy. According to one aspect, a wireless room occupancy monitor is provided. The wireless room occupancy monitor includes: an antenna array configured to detect wireless transmissions from a tag device; a wireless transceiver configured to receive the wireless transmissions detected by the antenna array and produce receive signals; a processor configured to process the receive signals; and a motion sensor coupled to the processor and configured to wake up the processor in response to detecting when the tag device enters or exits a room. The antenna array and motion sensor are configured to be mounted on a ceiling of the room, just inside an entryway to the room. In operation, after the motion sensor wakes up the processor, the processor is configured to power on the wireless transceiver and run an algorithm on a sequence of received signal strength estimates and array response vectors derived from the receive signals to determine when the tag device has entered or exited the room via the entryway.

According to another aspect, a room occupancy detection system is provided. The room occupancy detection system includes: one or more room occupancy monitors configured to detect entries into a room and exits from the room of one or more tag devices, and to produce room occupancy detection events; and a server configured to receive the room occupancy detection events from the one or more room occupancy monitors. Each of the one or more room occupancy monitors comprises: an antenna array configured to detect wireless transmissions from the one or more tag devices; a wireless transceiver configured to receive the wireless transmissions detected by the antenna array and produce receive signals; a processor configured to process the receive signals; and a motion sensor coupled to the processor and configured to wake up the processor in response to detecting when one of the one or more tag devices enters or exits the room. Each of the one or more room occupancy monitors is configured to be mounted on a ceiling of the room, just inside an entryway to the room. In operation, after the motion sensor wakes up the processor on any one of the one or more room occupancy monitors, the processor is configured to power on the wireless transceiver and run an algorithm on a sequence of received signal strength estimates and array response vectors derived from the receive signals to determine when one of the one or more tag devices has entered or exited the room via the entryway.

In accordance with still another aspect, a method is provided for training a machine learning algorithm for room occupancy monitoring. The method includes: storing receive signals produced by one or more room occupancy monitors as one or more tag devices enter into and exit one or more rooms, wherein the one or more room occupancy monitors are installed on a ceiling inside an entry of each of the one or more rooms, and wherein each of the one or more room occupancy monitors produces the receive signals from wireless transmissions from the one or more tag devices detected by an antenna array of the one or more room occupancy monitors; generating ground truth information comprising a time when each of one or more persons or machines wearing, carrying or using one or more of the tag devices entered or exited a room of the one or more rooms, an identity of the one or more tag devices that entered or exited the room of the one or more rooms, and the identity of each room occupancy monitor that detected one or more tag devices entering or existing the room of the one or more rooms; and providing the ground truth information and data descriptive of the receive signals to a machine learning algorithm to train the machine learning algorithm to detect room entries or exits using the ground truth information and the receive signals.

BRIEF DESCRIPTION OF THE DRAWINGS

The foregoing and other features of the present disclosure will become apparent to those skilled in the art to which the present disclosure relates upon reading the following description with reference to the accompanying drawings.

DETAILED DESCRIPTION OF THE INVENTION

From the above description, those skilled in the art will perceive improvements, changes and modifications. Such improvements, changes and modifications are within the skill of one in the art and are intended to be covered by the appended claims.

Presented herein is a Room Occupancy Monitor and a Room Occupancy Monitoring System. The Room Occupancy Monitor is, in one form, a battery-powered device that can be installed inside a room and configured to receive transmissions from one or more wireless tag devices to determine when any of the tag devices enter or exit the room. The monitor could be installed in a hospital patient room, for example, and used in a nurse-call cancellation application/ use case to determine when a nurse wearing a wireless (e.g., Bluetooth™ wireless 5.1) tag or badge has entered a room to visit a patient and automatically cancel the pending nurse call request at the nurse's station. It could alternatively be used in automated hand hygiene compliance applications to make sure doctors and nurses are disinfecting their hands each time they enter or exit a patient room. There are other uses of the Room Occupancy Monitor and Room Occupancy Monitoring System in addition to healthcare applications. The monitor could be installed on the ceiling in a hallway and used as a chokepoint monitor to detect a passersby in either direction, in hotel rooms for staff duress applications, in industrial or commercial environments to provide access control to various parts of a building using Bluetooth badges, in museums or retail stores to monitor customer behavior or to provide waypoint information. There are numerous other uses of the Room Occupancy Monitor and Room Occupancy Monitoring System, not specifically mentioned herein.

The tag devices could be carried or worn by one or more persons or could be carried, mounted, integrated in, or attached to one or more machines or equipment that may move in and out of a room or space of interest. Insofar as these techniques are applicable to tracking movement (in and out of a room or space of interest) of machines or equipment, the machines or equipment may be configured to move under its own power and control autonomously (e.g., robot) or by physical assistance from a human.

Figure 1:
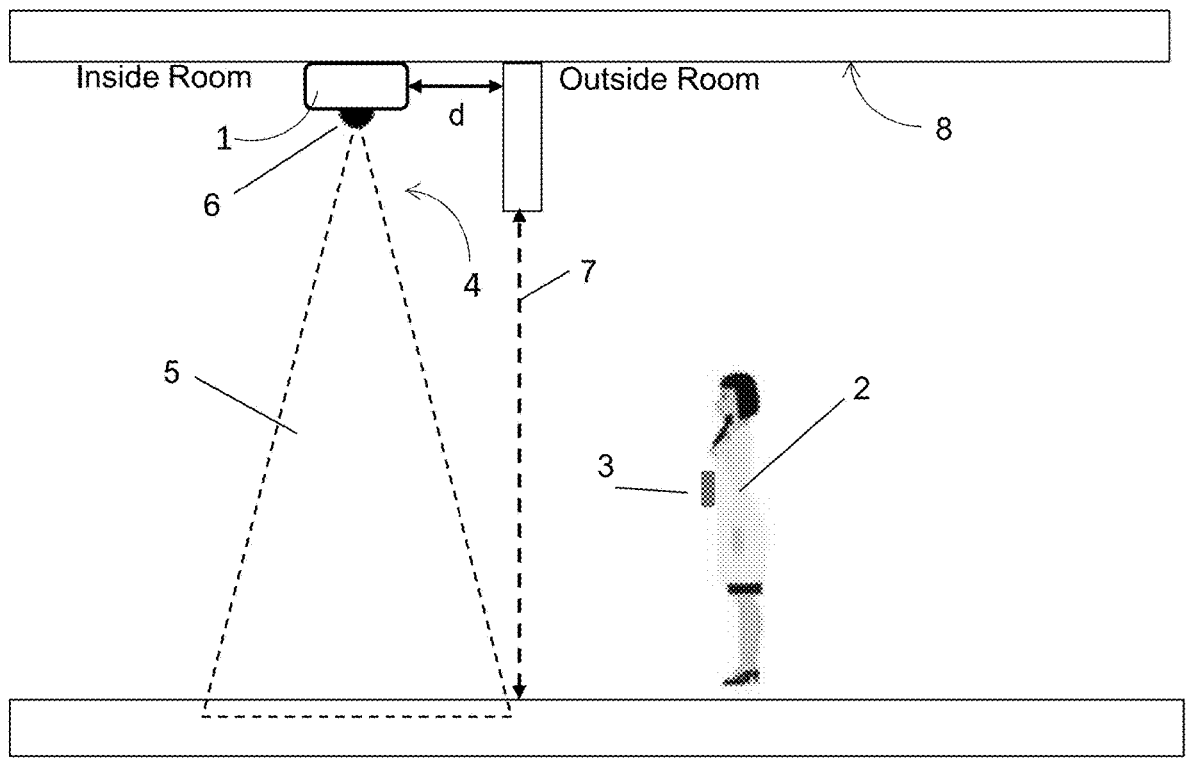
FIG. 1 is an illustration showing a person wearing a wireless tag device approaching a room with a room occupancy monitor installed in the entryway, according to embodiments presented herein.

FIG. 1 illustrates how a room occupancy monitor could be installed and used to monitor a room, in accordance with one embodiment. The room occupancy monitor ("monitor") 1 is installed just inside an entryway 7 to a room 4. For example, the monitor 1 is affixed to the ceiling 8 a predetermined distance d (e.g., approximately six inches) inside a threshold to the entryway 7. The monitor 1 is equipped with a motion sensor 6, such as a passive infrared (PIR) sensor with a narrow field of view (FOV) 5. The motion sensor 6 is used to wake up the monitor 1 from a low-current sleep state when a person 2 wearing or carrying a tag device 3, enters or exits the room 4. The tag device 3 may also be affixed to another object such as an infusion pump or ultrasound machine which is pushed in or out of the room 4 by person 2.

Figure 2:
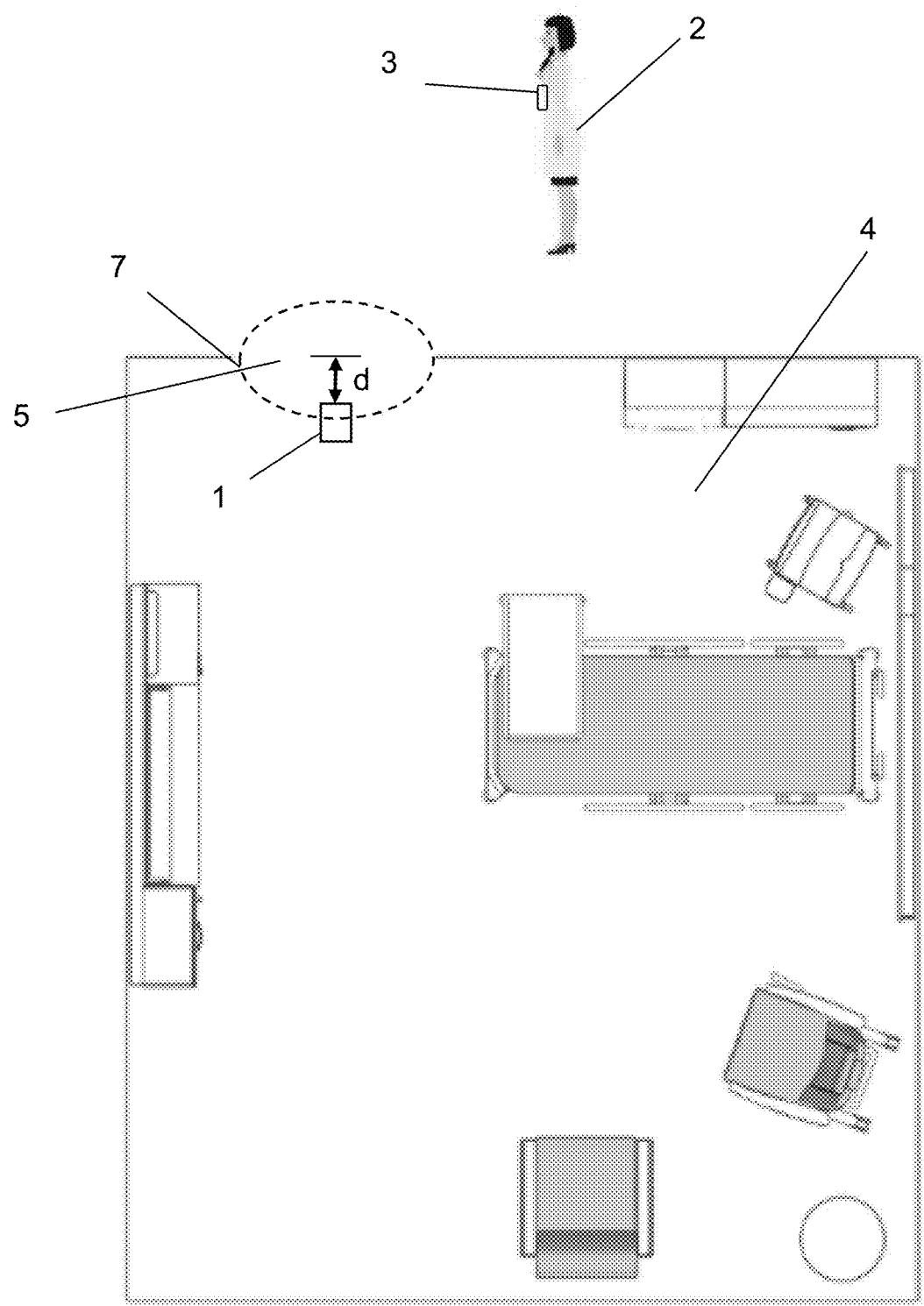
FIG. 2 is a top-level view of the scenario shown in FIG. 1.

FIG. 2 shows a top-down view of the scenario illustrated in FIG. 1. This illustration shows how the motion detector's narrow FOV 5 spans the entire width of the room entryway 7 but extends only slightly into and/or outside of the room 4. The narrow FOV 5 allows motion detector to conserve the monitor's battery energy by triggering typically only when a person enters or leaves the room, and not triggering when there is motion inside the room or outside the room in a hallway.

Figure 3:
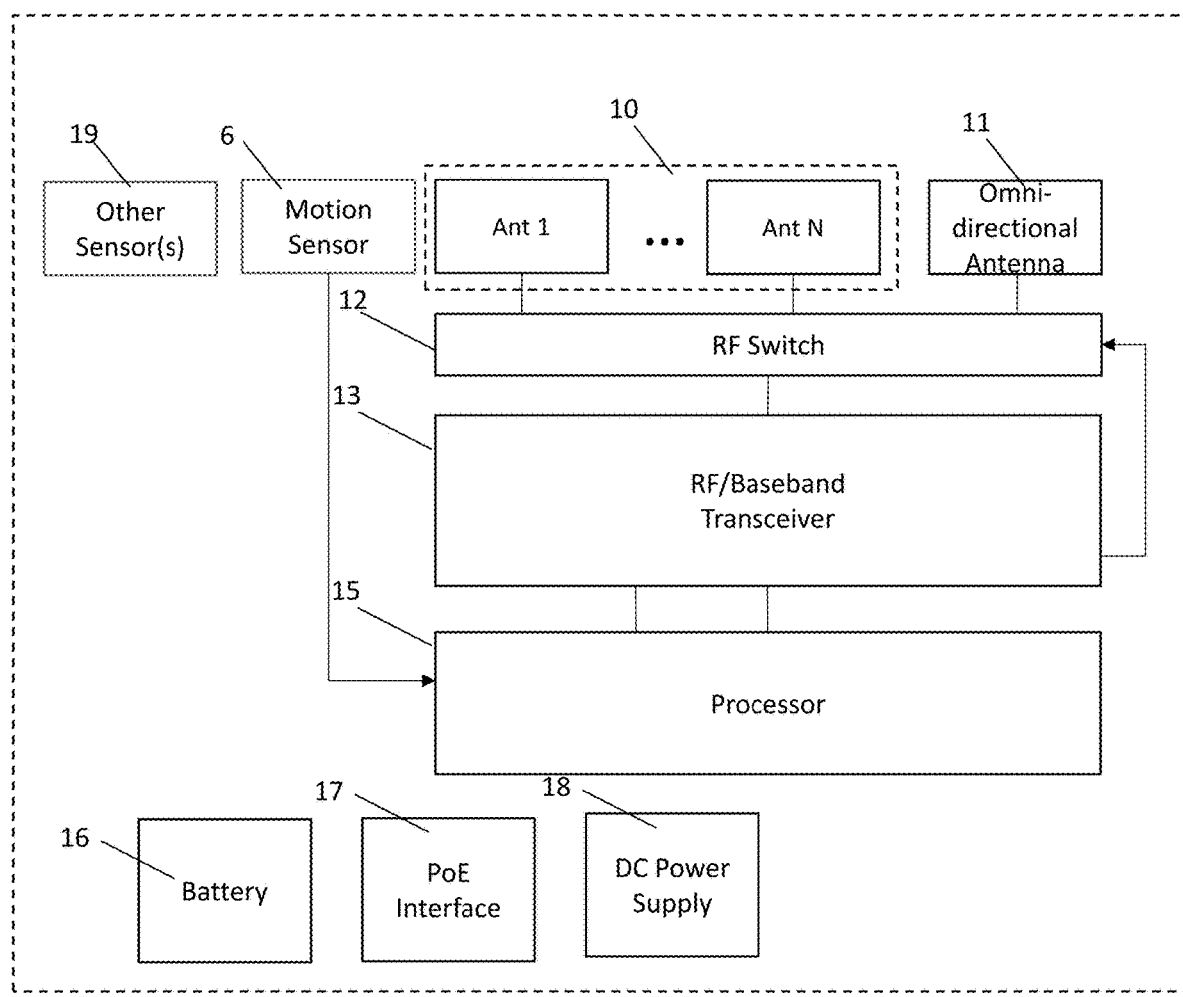
FIG. 3 is an exemplary electrical block diagram of a room occupancy monitor, in accordance with one embodiment.

Turning now to FIG. 3, a schematic block diagram of the monitor 1 is shown, in accordance with one embodiment. The monitor 1 contains an antenna array 10 to detect the wireless signals transmitted by a tag device and a radio frequency (RF)/Baseband transceiver 13 to downconvert, demodulate and decode the received signals according to a wireless standard, such as Bluetooth™ 5.1. The RF/Baseband transceiver passes the decoded output to processor 15. When the motion sensor 6 detects motion, it wakes up the processor 15 to begin processing the received signals from the transceiver 13 to determine whether (the person 2 wearing, carrying, or moving) the tag device 3 has entered or exited the room 4, as depicted in FIG. 1. The transceiver 13 may include an RF switch 12 to select which of the antenna array antenna elements of the antenna array 10 to use when receiving the wireless signal from a tag. The RF switch 12 could also be used to switch to using an omnidirectional antenna 11 when the RF/Baseband transceiver 13 needs to transmit a signal, to or receive a signal from, the tag device 3 or some other device without needing to use the direction of arrival information that the antenna array 10 provides.

The monitor 1 may include one or more batteries 16 to provide power to the electronics without requiring a cable run during installation. Alternatively, the monitor 1 could be powered through a Power-over-Ethernet (PoE) cable interface 17, or a standard DC power supply 18 which plugs into an external AC mains.

The motion sensor 6 could be a passive infrared (PIR) type of sensor, which may be configured to consume very little current when no motion is detected. A number of other variations for the motion sensor 6 include ultrasound, infrared or laser ranging sensors, a thermopile sensor, or an RF Doppler motion sensor.

Other sensors 19, such as a multi-zone IR thermopile sensor, a digital camera or an inertial motion unit (IMU), could be used to provide additional inputs to a room occupancy monitoring algorithm, described further below.

Figure 4:
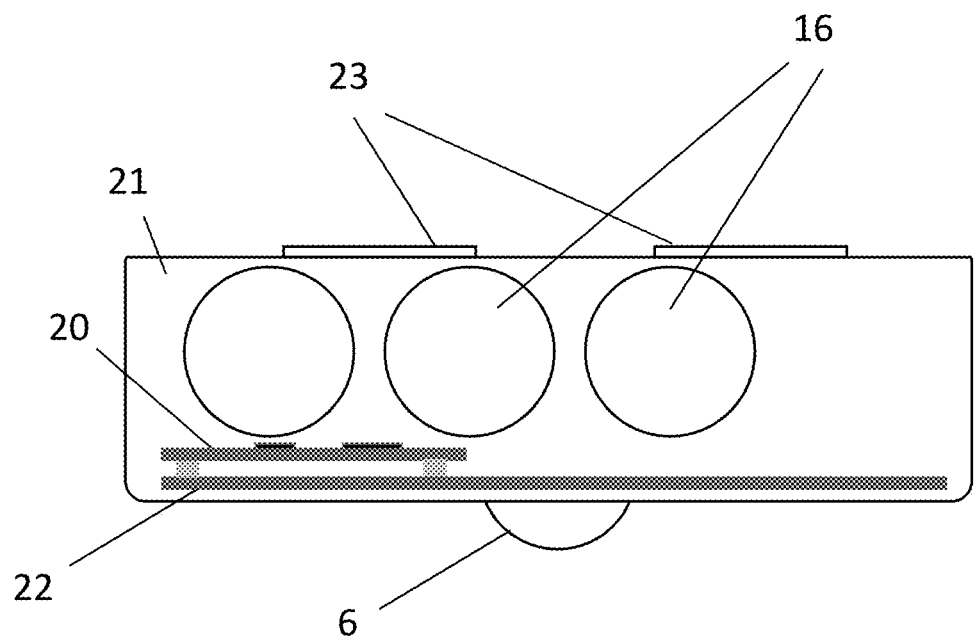
FIG. 4 is an exemplary block diagram showing the mechanical components of a room occupancy monitor, in accordance with one embodiment.

Turning now to FIG. 4, a physical illustration of the monitor 1 is shown, in accordance with one embodiment. In this embodiment, the monitor electronics, such as the RF/Baseband transceiver 13, processor 15 and RF switch 12, are mounted on a first printed circuit board (PCB) 20, which sits on top of a second PCB 22 containing the antenna array 10. Both PCBs 20 and 22 are mounted inside a plastic enclosure 21, along with three batteries 16. The motion sensor 6, in the arrangement shown in FIG. 4, may be a PIR sensor with a Fresnel lens mounted on the bottom of the enclosure 21. The enclosure 21 may have plastic mounting tabs 23 used to attach the monitor 1 to a ceiling tile ceiling with metal crossbars, and held in place using zip-ties, double-sided tape, Velcro® fastener, magnets, or some other mounting mechanism.

Figure 5:
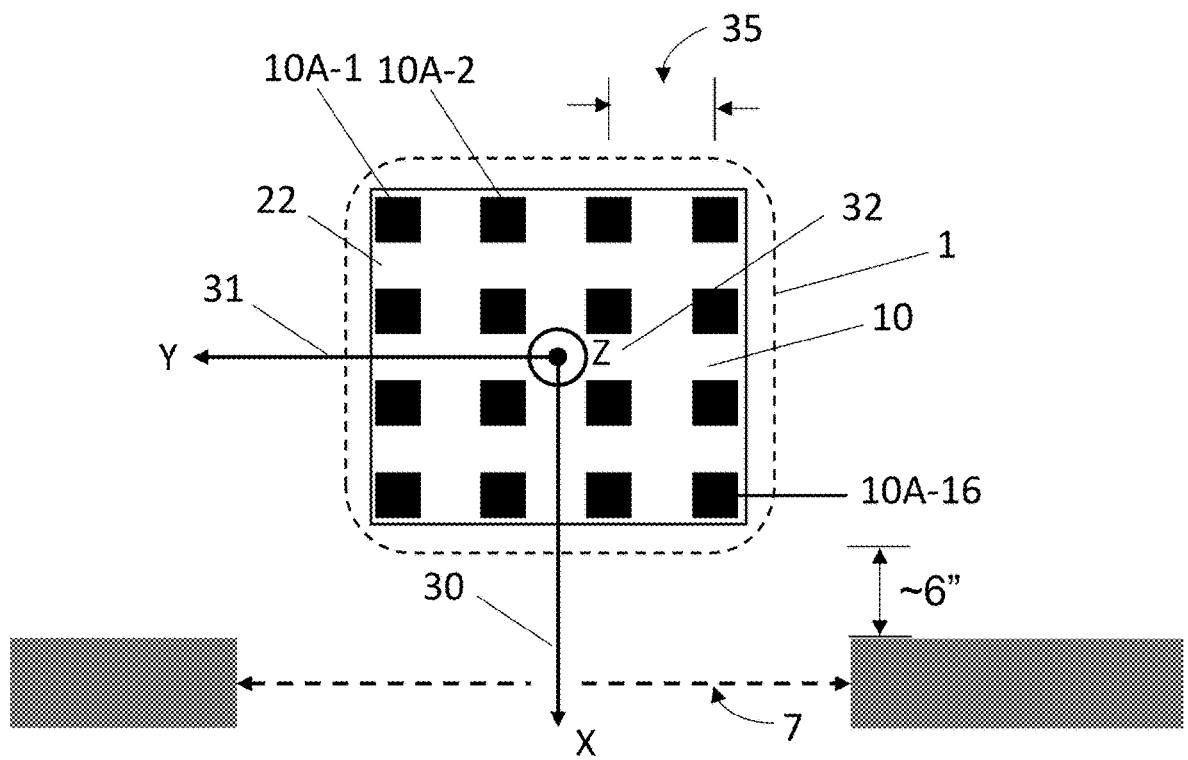
FIG. 5 is a diagram showing a view of an antenna array of a room occupancy monitor from a view looking at the monitor from below, in accordance with one embodiment.

Turning now to FIG. 5, a view of the antenna array 10 inside the monitor 1 is shown from a view looking up at the monitor 1 from below, in accordance with one embodiment. In this embodiment, the antenna array 10 is implemented as a set of 16 square patch antennas 10A-1 to 10A-16, each of which is etched into the copper layers of PCB 22.

A monitor-centric rectangular coordinate system is shown in FIG. 5. The origin of the coordinate system is the center of the antenna array 10. The X and Y axes are co-planar with the array PCB 22, with the positive X axis 30 extending directly out the entryway 7, and the positive Y axis 31 pointing to the left of the entryway 7 when looking into the room from outside. The positive Z axis 32 is perpendicular to the PCB 22 and points down from the array center toward the floor.

There is a spacing 35 between the centers of two adjacent patch elements. This spacing 35 may be a third of a wavelength. In a multipath-free environment, this would ensure a measured phase shift of at most 120 degrees between any two adjacent antenna elements regardless of where the transmitter of the tag device 3 is positioned relative to the antenna array 10.

Figure 6:
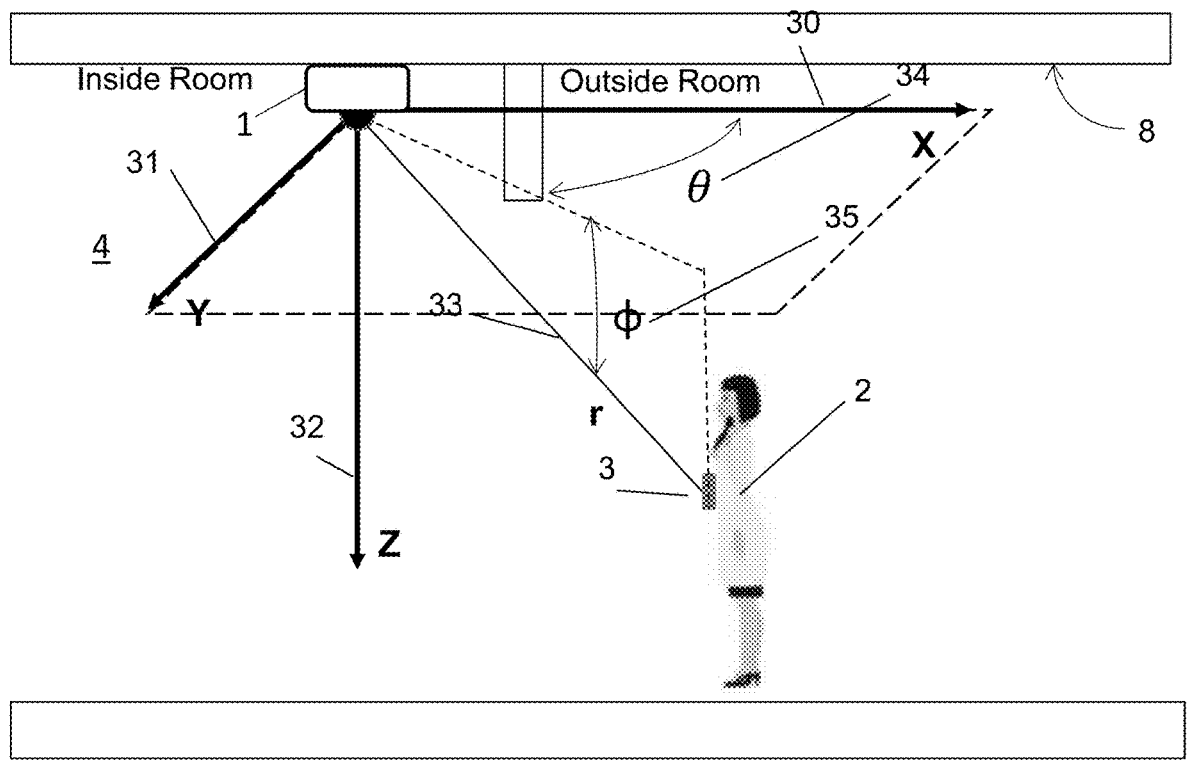
FIG. 6 is a diagram showing arrangement of an antenna array of a room occupancy monitor relative to a rectangular coordinate system.

Reference is now made to FIG. 6, which illustrates a side perspective view of the room 4 with a three-dimensional (3D) perspective of the monitor-centric rectangular coordinate system. FIG. 6 also shows spherical coordinates as well, with the r axis 33 representing the distance from the origin, the θ axis 34 representing the azimuth angle, and the φ axis 35 representing the elevation angle to the tag device 3.

In other embodiments, the monitor 1 could be installed at an angle on the ceiling or wall of the room entryway, with the plane of its antenna array 10 aiming into the room 4 instead of straight down from the ceiling. The monitor 1 could be installed on the wall on either side of the entryway at the approximate height where the tag device 3 is worn by the user 2, with the plane of the antenna array 10 oriented parallel to the wall.

Figure 7:
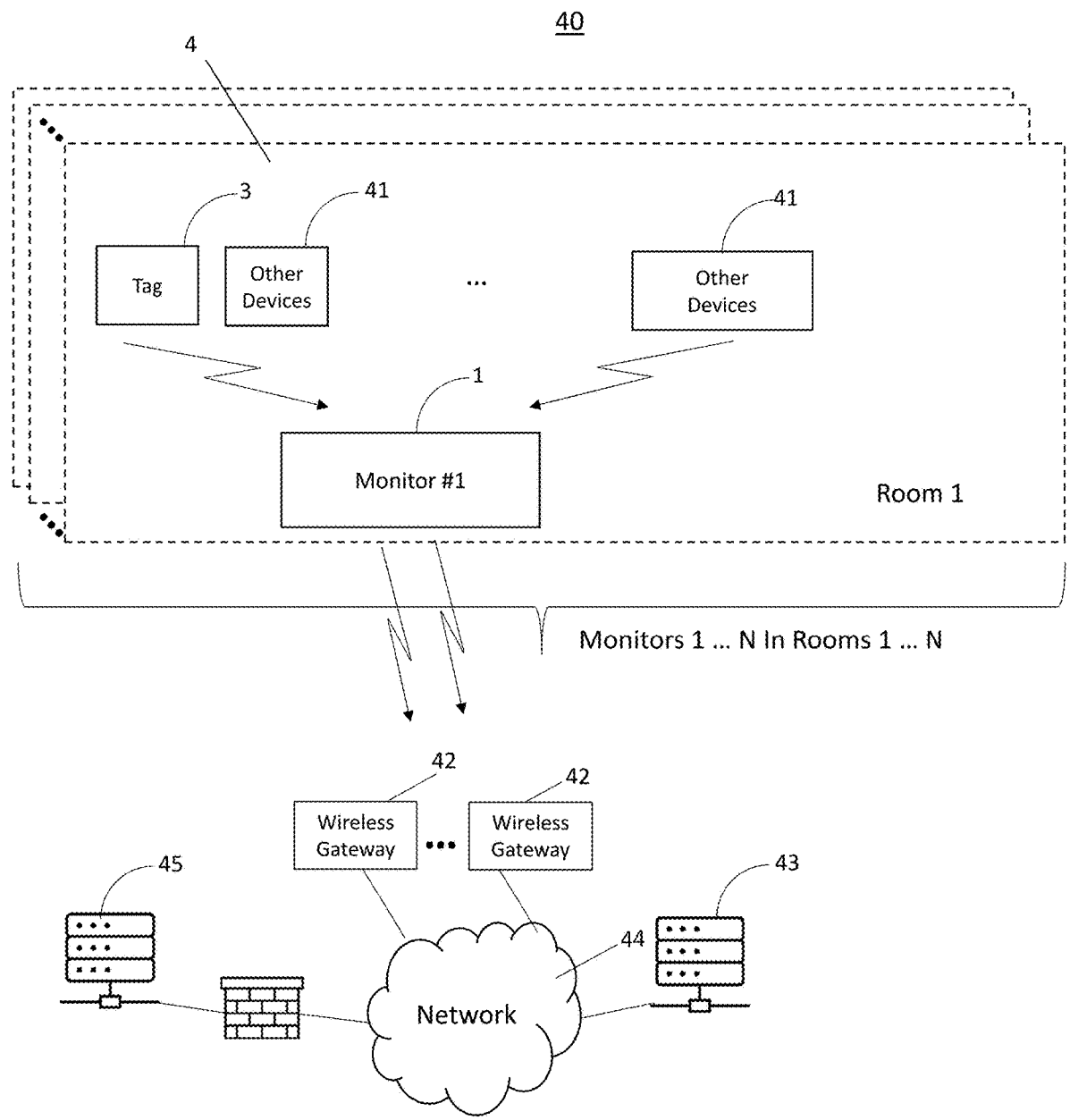
FIG. 7 is a block diagram of a room occupancy monitoring system that includes as plurality of room occupancy monitors, in accordance with one embodiment.

Referring now to FIG. 7, a room occupancy monitoring system 40 that operates with one or more monitors 1, is shown. Reference is also made to FIG. 3 in connection with the description of FIG. 7. In the system 40, a plurality of monitors 1 are installed in a number of different rooms 4. Each monitor 1 in the system could be used to monitor one or more tag devices 3 or other types of wireless emitters, called "other devices" 41. Other devices 41 may include badges, medical equipment with asset tags attached, wrist band devices, as well as consumer devices, such as Smartphones, tablets, Smart Watches, etc., that use a wireless standard, such as Bluetooth™ 5.1.

Each monitor 1 in system 40 performs a room monitoring algorithm to determine when tag devices 3 or other devices 41 enter or exit the monitored rooms. Whenever a monitor 1 detects a room entry or exit, it wirelessly transmits to one or more nearby gateway devices 42 a room occupancy detection event message including information describing or indicating the event type (i.e., entry or exit), the tag device ID (for example, Bluetooth™ or Media Access Control (MAC) address of the tag device 3 or other device 41), and the monitor ID (for example, the Bluetooth™ or MAC address of the monitor). The monitors 1 could transmit the room detection event message using the Bluetooth™ 5.1 RF/Baseband transceiver 13 that was used to receive transmissions from the tag device 3 via the antenna array 10. The monitors 1 could set the RF switch 12 to transmit the room detection event message using the omnidirectional antenna 11 to increase the chances that it is picked up by at least one gateway device 42. Each gateway device 42 that received the room detection event message relays the message to a server 43 via network 44. The server 43 removes any duplicate room detection event messages, and then formats and forwards a final room detection event to another server 45 (for example, a nurse call or hand hygiene monitoring server in a hospital) external to the room monitoring system 40.

Figure 8:
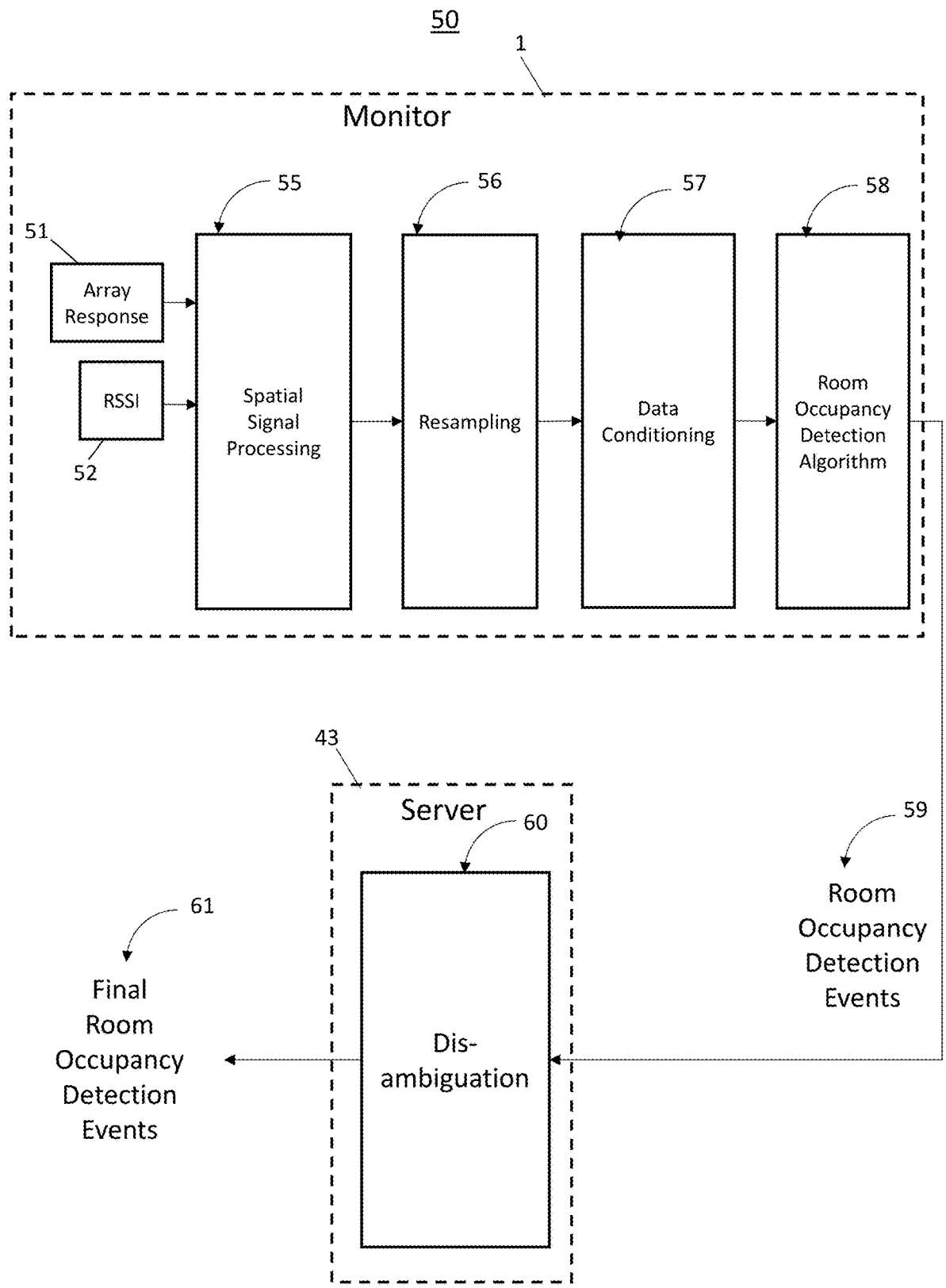
FIG. 8 is a diagram illustrating the signal processing performed on a room occupancy monitor, in accordance with one embodiment.

Turning now to FIG. 8, a signal processing data flow 50 is described, in accordance with one embodiment. Reference is also made to FIG. 3 for purposes of this description of FIG. 8. Wireless transmissions sent from the tag device 3 are detected at the antenna array 10 of a monitor, and down-converted, demodulated and decoded in transceiver 13, producing receive signals which are then presented to processor 15. If the wireless signals sent by the tag device 3 are formatted according to the Bluetooth™ 5.1 wireless standard, they could include a Constant Tone Extension (CTE) segment at the end of the packet, allowing the RF/Baseband transceiver 13 to switch through all the elements of the antenna array 10 during the segment and to digitize the in-phase (I) and quadrature (Q) components of the CTE signal after each switching period. Each CTE received by the RF/Baseband transceiver 13 produces an array response vector 51 containing N complex I/Q measurements which can be written as follows:

$$z \triangleq [I_1+jQ_1, \ldots I_N+jQ_N]. \quad (1)$$

where N is the number of antennas in the antenna array 10, and a received signal strength indicator (RSSI) measurement 52 containing the received signal strength of the received packet in dBm. The RSSI measurement 52 is typically taken on a single antenna, which is often the first antenna element of array 10.

Each I/Q measurement $I_n+jQ_n$ in the array contains the in-phase (I) and quadrature (Q) components of the CTE tone as received from the nth antenna. The amplitude and phase of the CTE tone can be derived from the I/Q samples using $$\sqrt{I_n^2+Q_n^2} \text{ and } \tan^{-1}Q_n/I_n,$$

respectively. Because the I/Q values depend on the gain of the receiver, which generally varies from packet to packet, the above definition of z in (1) only contains information about the relative amplitude of the CTE on each antenna element. The definition can be modified as follows to include absolute signal level information:

$$z \triangleq \frac{10^{R_1/20}}{\sqrt{I_1^2+Q_1^2}} \cdot [I_1+jQ_1 \ldots I_N+jQ_N]. \quad (2)$$

The $R_1$ parameter in the above expression represents the RSSI estimate provided by the transceiver 13 in dBm as seen through the first antenna. The scaling factor $$\frac{10^{R_1/20}}{\sqrt{I_1^2+Q_1^2}}$$

in the expression is used to scale all the elements of z by the gain of the receiver to make it so that the magnitude squared of any component of z has units of milliwatts (mW). Therefore, taking 20 times the base ten logarithm of the magnitude of any of the elements of z will yield an estimate of the power seen through that antenna path in decibels relative to one milliwatt, or dBm. In particular, for the first element $|z_1|$ of z, one can verify that $$20 \cdot \log_{10}|z_1| + 20 \cdot \log_{10}\left[10^{\frac{R_1}{20}}\right] = R_1$$

which yields $R_1$, which is as expected. Another useful RSSI metric that can be computed is the average RSSI overall all N antennas, which can be written $$R_{Av} = 10 \cdot \log_{10} \frac{1}{N} \sum_{n=1}^{N} |z_n|^2 = R_1 + 10 \cdot \log_{10} \frac{1}{N}\left(1 + \frac{|z_2|^2}{|z_1|^2} + \ldots + \frac{|z_N|^2}{|z_1|^2}\right), \quad (2)$$

which, like $R_1$, also has units of dBm. In a highly reflective indoor wireless environment, the parameter $R_{Av}$ defined in (2) has the advantage of having N times less variance than $R_1$ or any other RSSI measurement from a single antenna. Thus, a new definition for the array response vector z based on the lower variance RSSI estimate in (2) is as follows:

$$z \triangleq \frac{10^{R_{Av}/20}}{\sqrt{I_1^2+Q_1^2}} \cdot [I_1+jQ_1 \ldots I_N+jQ_N]. \quad (3)$$

Equation (3) shows a method for combining the I/Q samples 51 and the single-antenna RSSI 52 signals that are received from RF transceiver 13 for each received CTE from a tag into one combined array response vector.

The data processing flow 50 includes a spatial signal processing step 55, a resampling step 56, a data conditioning step 57, and a room occupancy detection algorithm 58, all of which may be performed on each monitor, to generate room occupancy detection events 59. The room occupancy detection events 59 are provided to server 43. The server 43 executes a disambiguation procedure 60 to generate final room occupancy events 61.

Figure 9:
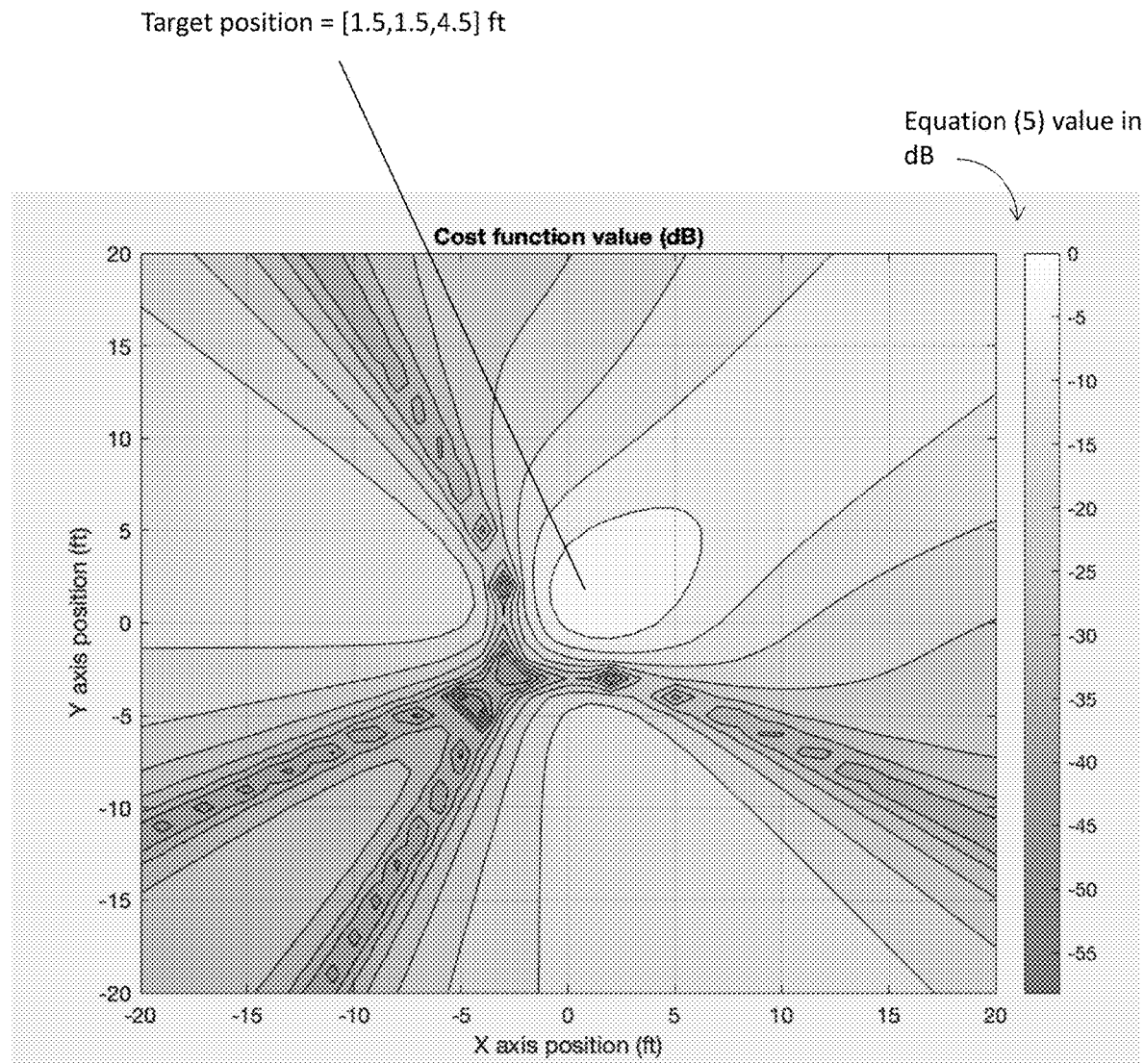
FIG. 9 is an exemplary plot showing the output of a beamforming cost metric evaluated over a set of grid of positions centered around a room occupancy monitor.
Figure 10:
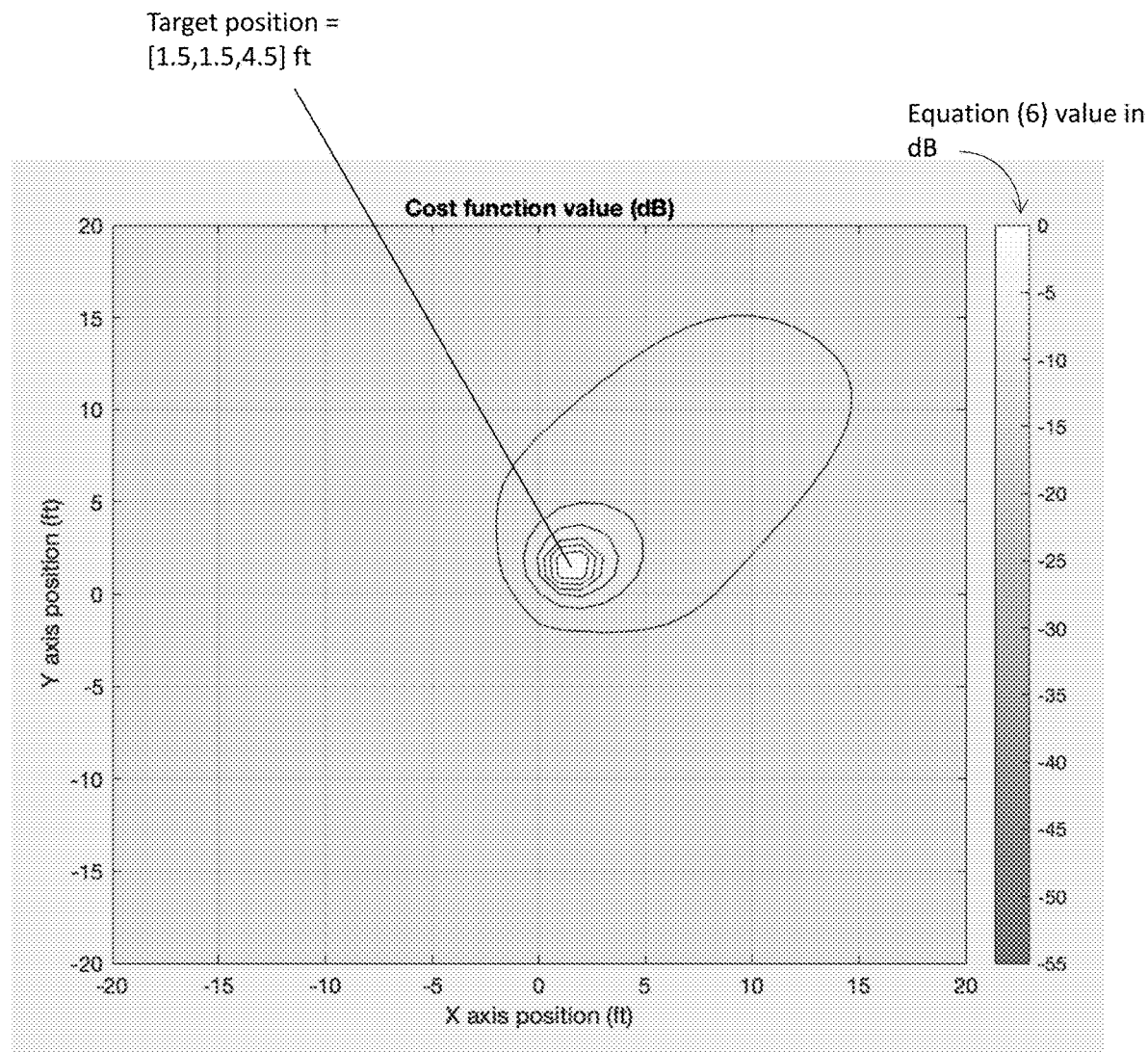
FIG. 10 is an exemplary plot showing the output of a position estimation cost metric evaluated over a set of grid of positions centered around a room occupancy monitor.

The spatial signal processing step 55 is now described with reference to FIG. 8, together with FIGS. 9 and 10.

Spatial signal processing step 55 generates spatial positioning information for the tag device 3 from the received sequence of array response vectors to estimate the position of tag device 3 relative to the monitor 1. The spatial positioning information is contained in likelihood vs. position vectors output from the spatial signal processing step 55, with each likelihood vs. position vector containing information related to the likelihood (or probability) that the tag device 3 is positioned at a particular grid point position over a set of candidate grid point positions in the vicinity of monitor 1.

Let $p_1, \ldots, p_M$ represent a set of M candidate points in 3D space using the monitor-centric coordinate system defined earlier. Each point $p_m$ can be written as a 3-vector $$p_m=[x,y,z],$$

where x, y, and z are the components of $p_m$ along the X, Y and Z axes 30, 31 and 32 respectively. As an example, a grid of M=400 points could be defined over a 20 foot by 20-foot rectangular region centered at the monitor, where the grid points are uniformly spaced by one foot in either the X or Y directions, and each point is assigned a fixed Z axis value of 4.5 feet from the monitor. A mathematical description of this example grid is as follows:

$$p_m = [-20, -10, 4.5] + \left[2m - 20 \cdot \left\lfloor\frac{m}{20}\right\rfloor, \left\lfloor\frac{m}{20}\right\rfloor, 0\right], m = 0, \ldots, 399 \quad (4)$$

It should be noted that although the grid points in the above example are uniformly spaced, there is no requirement for them to be.

One well-known way of generating likelihood vs. position information for tag device 3 is to use beamforming. For each candidate grid position $p_m$, the beamforming algorithm computes the following:

$$y_m = a_m^H R a_m. \tag{5}$$

The vector $a_m$ is an "expected array response vector" with the same dimension N as the array response vector z. It contains the (complex) array response that would be observed at the antenna array 10 for an open-space wireless transmission from a device positioned at grid point $p_m$. The matrix R is a complex N×N Hermitian covariance matrix of the array response vector z. R can be estimated using single array response vector z as follows: $R = zz^H$. Substituting this definition of R into equation (5) yields $y_m = |a_m^H z|^2$. This form of beamforming can be viewed as a "spatial matched filtering" operation, since it is effectively cross-correlating a received array response vector z with a set of M hypothetical responses—one for each candidate spatial position. For a transmitting device positioned at, for example, the kth candidate grid position in open space, one would expect to see maximum power precisely at the kth grid point. This is illustrated in FIG. 9, where the cost function (5) is evaluated at each point on the example grid defined in (4) and shown in a contour plot. It can be shown that for an open space wireless environment, equation (5) is the log-likelihood function for the position of the tag device 3 given a received array response vector from the tag. The maximum likelihood position can be found by finding the grid position $p_{m0}$ that maximizes (5). For the example shown in FIG. 9, that position $p_{m0}$ is at [1.5, 1.5, 4.5] feet on the rectangular monitor-centric coordinate system defined earlier herein.

For a more robust beamforming implementation, instead of using only a single array response vector to estimate the covariance matrix R, one could improve the estimate by using a running average over the L most recently received array response vectors. Using this approach, the covariance matrix after the nth array response vector received would be computed as:

$$R_n = \frac{1}{L} \sum_{l=0}^{L-1} z_{n-l} z_{n-l}^H.$$

Another popular array-based position estimation technique is Multiple Signal Classification (MUSIC). MUSIC is a so-called subspace technique that uses a singular value decomposition (SVD) of the covariance matrix R to find a basis for its null-space, and then uses a search to find spatial grid positions that have expected array responses that are orthogonal or nearly orthogonal to the null-space. The MUSIC cost function can be written $$y_m = \frac{1}{a_m^H U U^H a_m} \tag{6}$$

where U is the N×(N−r) matrix containing the lowest order N−r left singular vectors for the covariance matrix R, and r is an estimate of the rank of R. Note that the columns of the U matrix form an orthonormal basis for the null-space of R. For grid positions that are close to the actual position of the target wireless transmitter, the denominator of (6) becomes small (and thus its reciprocal (6) becomes large) since at these positions the $a_m$ vector will approximate the actual received array response vector, which, by definition, is orthogonal or nearly orthogonal to the columns of the U matrix.

Since the goal in MUSIC is to find grid positions that maximize the cost function (6), that cost function reflects in some way the likelihood or probability of the tag device 3 being positioned at grid point $p_m$. The MUSIC approach is a popular alternative to beamforming-based position estimation algorithms because it is known to be able to find the target's position with higher spatial resolution. A contour plot of the MUSIC response (6) for the previous example is shown in FIG. 10. Note from the figures that the MUSIC response contains a very sharp peak at the true target position—much sharper than the beamformer response (5) shown in FIG. 9.

There are other well-known array-based position estimation techniques in addition to the classical beamforming and MUSIC approaches discussed above, including Minimum Variance Distortionless Response (MVDR) beamforming and Estimation of Signal Parameters by Rotational Invariance Techniques (ESPRIT). Any of these techniques could be used to provide likelihood vs. position information for the tag device 3 as part of the spatial processing algorithm 55.

Referring back to FIG. 8, following the spatial signal processing step 55, resampling step 56 may be used to interpolate and replenish any missing samples due to missed CTE packets. In one form, resampling could be done using a nearest-neighbor approach. Other more intricate but well-known forms of interpolation could be used to fill in any missing samples, including linear or quadratic interpolation, spline, sinc, and polynomial interpolation approaches. It should be noted that the resampling step 56 could be done before the spatial signal processing 55, if desired.

Following the resampling step 56 is a data conditioning step 57 followed by execution of room occupancy detection algorithm 58. The data conditioning step 57 is only required if the room occupancy detection algorithm 58 is a machine learning (ML) algorithm, such as a neural network. The data conditioning step 57 is used to adjust the mean and variance of the input parameters to ensure good performance. The output from room occupancy detection algorithm 58 consists of room occupancy detection events 59, which consist of either entry or exit events that are sent when the tag device 3 is detected as having either entered or exited the monitored room 4. The room occupancy detection events 59 detected at the monitor 1 could be sent wirelessly from the monitor to the server 43 via one or more wireless gateways 41 using the Bluetooth™ wireless data protocol. For these transmissions, the omni-directional antenna 11 may be used on the monitor 1 to give reliable performance.

Since wireless RF signals easily propagate through walls, when a person 2 carrying a tag device 3 enters a monitored room, it is possible for two or more monitors to detect the tag device 3 as having entered their rooms at or around the same time. This often happens when the person enters two neighboring rooms with entryways that are very close to each other—sometimes as little as 4 feet between entryway centers, or when one room is located directly above another room on different floors of a multi-story building. It is for this reason that the server 43 from time to time performs the disambiguation procedure 60 to identify which of the two or more monitored rooms was entered.

Figure 11:
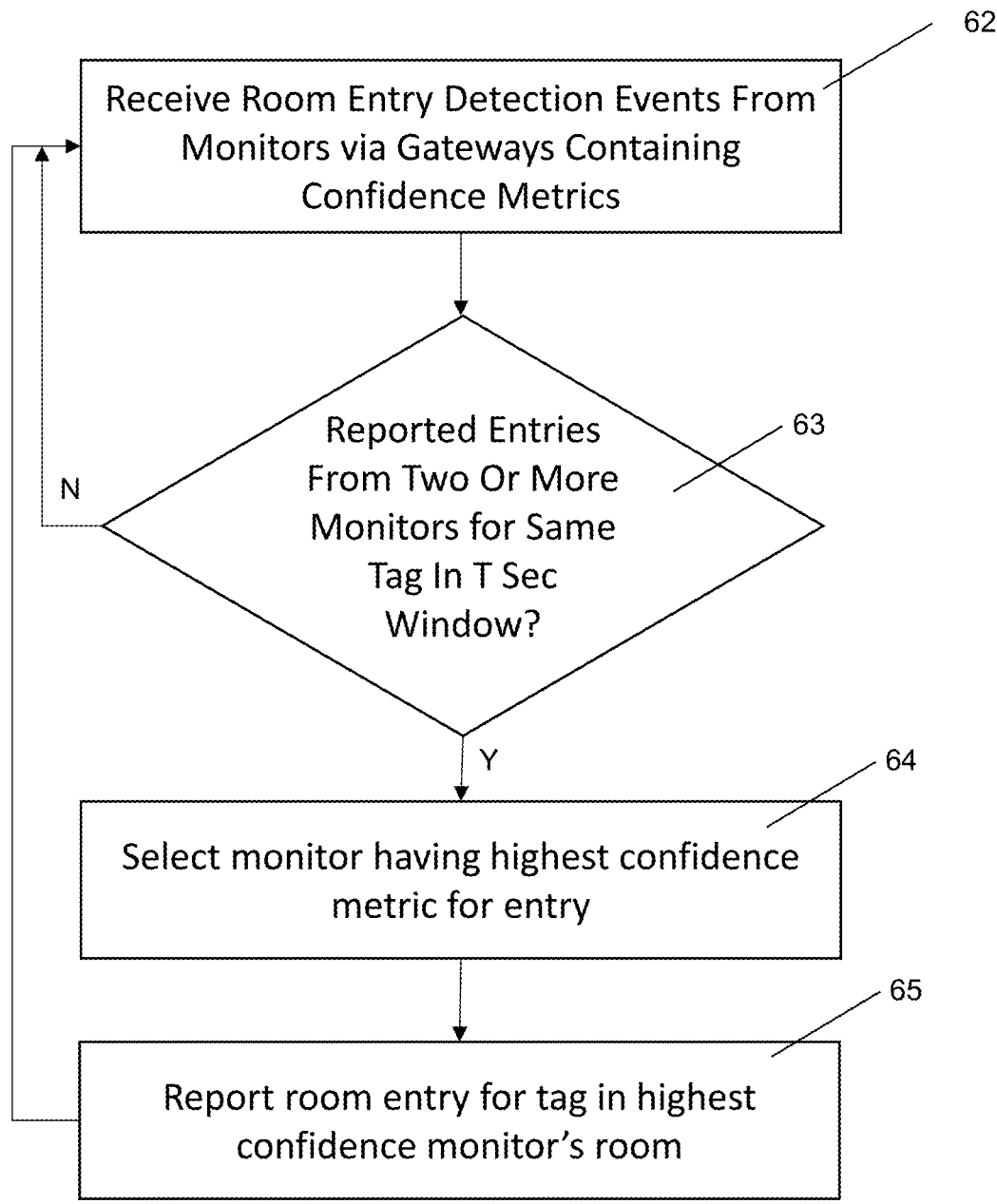
FIG. 11 is a flow chart depicting a disambiguation procedure used when multiple monitors detect a room entry for the same tag device, according to an example embodiment.

Reference is now made to FIG. 11, which shows a flow chart describing the disambiguation procedure 60. In step 62, the server 43 receives room entry detection events from the monitors 1 via the gateways 41. The room entry detection events sent from each monitor in step 62 contain both the identity of the tag device and the room where the detection event was made, as well as a confidence metric quantifying the monitor's level of confidence that the tag device entered that room. If the room occupancy detection algorithm 58 is a machine learning algorithm such as a neural network, the confidence metric could be the soft output (in units of logits, for example) from the neural network. If the room occupancy detection algorithm 58 uses a non-machine learning process, the confidence metric could be based on one or more normalized and scaled algorithmic parameters, such as received signal strength or X/Y position. In step 63, when a room entry detection event is received at the server indicating that a tag has entered a room, the server waits for a waiting period—typically 1-2 seconds—to determine if any other room entry detection events for that same tag device arrive from any other rooms. In step 64, if two or more room entry detection events for the same tag device are received from different rooms within the 1-2 second waiting period, the server selects the room served by the monitor having the highest confidence metric as the room that was entered, thus disambiguating the multiple entry events. In step 65, the server records that room in a database, reports to its outbound software APIs that the tag entered the highest-confidence room, and then returns to looking for more entry events in step 62.

The room occupancy detection algorithm 58 could be implemented using a machine learning approach entirely, a wholly "traditional" (i.e., non-machine learning) algorithm, or a combination of both. If a machine learning algorithm is used in whole or in part, that algorithm is trained using training data that behaves as if it came from a real deployed system and operating environment.

Figure 12:
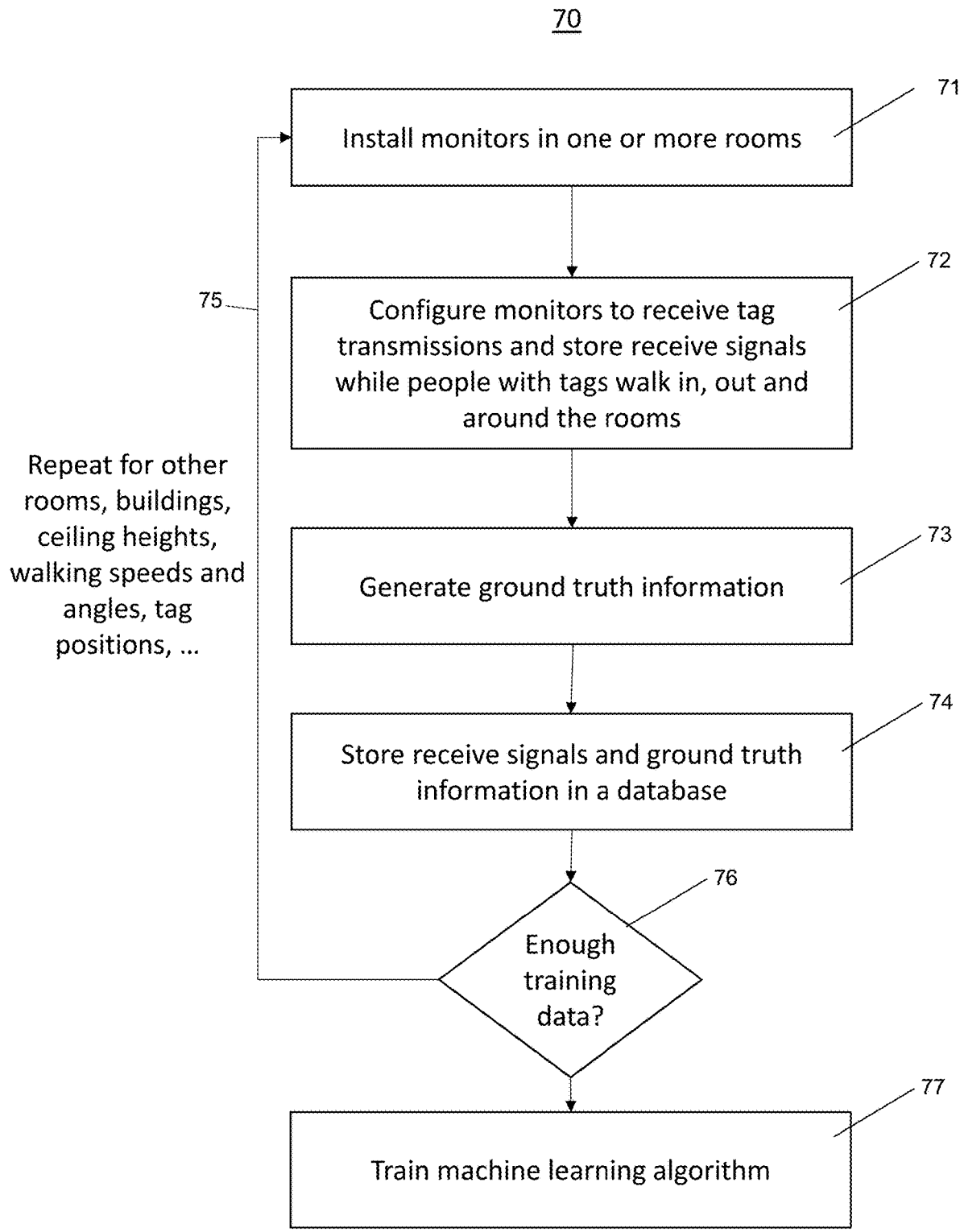
FIG. 12 is a flow chart of a method for training a machine learning (ML) based room occupancy detection algorithm, according to an example embodiment.

Reference is now made to FIG. 12, which shows a flow chart of a method 70 for training such a machine learning algorithm. Reference is also made to FIG. 7 for purposes of the description of FIG. 12. In step 71, one or a plurality of monitors 1 are installed on the ceiling inside one or multiple rooms 4 in an area that resembles where the system 40 is intended to be used once in production. The monitor 1 should be installed on the ceiling just as it would be installed in practice, i.e., about 6 inches from the entry threshold in the center of the entryway. The monitor 1 should also be configured to operate just as it would in practice, i.e., the monitor should only wake up from sleep and begin receiving and storing data after it has been woken up by the motion sensor 6.

In step 72, each of the monitors is configured to receive, downconvert and detect wireless transmissions from one or more tag devices 3 as people 2 wearing, carrying or moving the tag devices walk into, out of, around the outside and around the inside of the monitored rooms 4. The monitors 1 are also configured to generate and record receive signals for each of the detected wireless transmissions. The receive signals could include the received array response vectors and RSSI estimates for each received transmission from the tags. The receive signals could also include the results of operations applied to the array response vectors or RSSI information, such as beamforming or MUSIC spatial processing. The operations could also include the results of other operations, such as resampling and data conditioning.

In step 73, ground truth information containing the tag device ID, room or monitor ID, entry time and exit time every time a tag device enters or exits a room is recorded and stored. The ground truth could be obtained by recording a video of the people wearing the tags walking in and out of the monitored rooms in step 72 and later playing back the video to determine with precision when each tag entered or exited each monitored room. In step 74, the recorded receive signals and ground truth information is stored in a training database.

In step 75, steps 71-74 are repeated at numerous different locations having different ceiling heights, floor layouts and construction materials. The people used to wear, carry or move the tag devices could enter or exit the rooms at different walking speeds and entry/exit angles, and change the way they wear, carry or move the tag to emulate the way the tag device will be used in practice as much as possible.

In step 76, the training procedure in steps 71-75 is terminated when it is determined that enough training data has been taken. This determination is usually made by partitioning the receive signals and ground truth information stored in the database into a training data set and a test data set. In one example, there is enough training data when adequate performance is achieved on the data set, and the machine learning algorithm performs adequately on the test data set and on data taken from new rooms or buildings. If the algorithm does not perform as well on newly obtained data from a new room, person, tag or environment as it typically does in the test set, this could mean that the algorithm needs to be trained on that new room or environment.

One class of machine learning algorithm that performs well for this application are so-called stateful deep learning algorithms, i.e., neural networks (NNs) that update and propagate state information at each input/output time step. Any of the following types of neural networks could be used for this purpose: recurrent NN (RNN), long-short-term memory NN (LSTM), convolutional NN (CNN) or a gated recurrent unit NN (GRU). It is also possible to use stateless NNs for this application as well as non-deep learning machine learning algorithms, such as decision trees, random forests, support vector machines, K-nearest neighbors, and the like. The training procedure 70 can be used to train and test any of these machine learning algorithms—either stateful or stateless.

Figure 13:
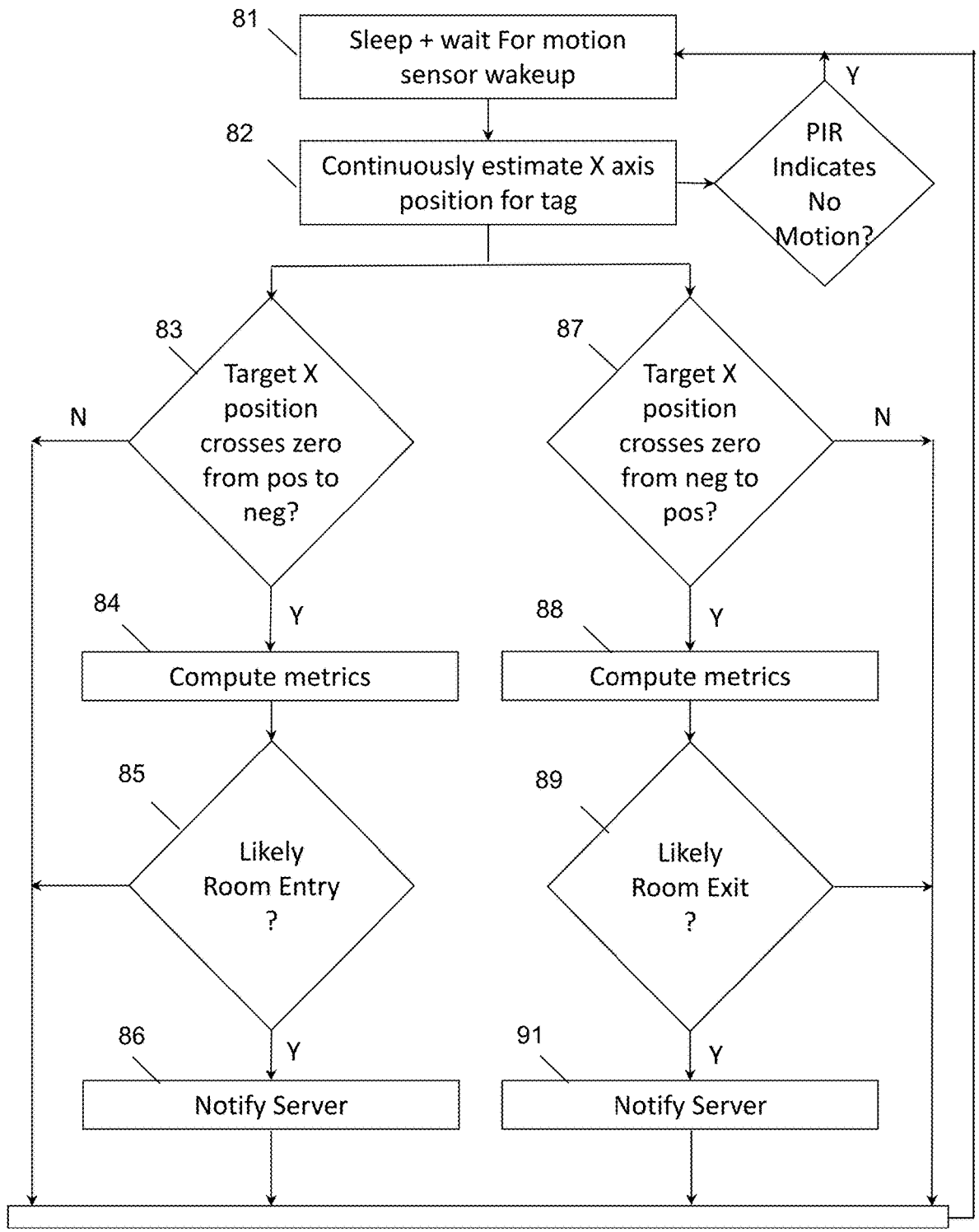
FIG. 13 is a flow chart of a non-ML-based room occupancy detection algorithm, in accordance with one embodiment.

It is also possible to implement room occupancy detection algorithm 58 using a more traditional, non-machine learning approach. One such approach is illustrated in FIG. 13, in accordance with one embodiment. FIG. 13 illustrates a flow chart for a (non-machine learning) room occupancy detection process 80. Reference is also made to FIGS. 3, 5 and 6 in connection with this description of FIG. 13. In step 81, the monitor 1 remains asleep in a low current state until it receives a wake-up signal from the motion sensor 6. In step 82, once the processor 15 wakes up, it powers on the RF/Baseband transceiver 13, configuring it to pass the array response and RSSI information received from any tags to the processor 15, and for each array response received, the processor 15 estimates the X axis position of the transmitting tag using the monitor-centric rectangular coordinate system defined earlier. The X axis position of the tag could be estimated by evaluating the beamforming or MUSIC cost functions (5) or (6) over a grid of candidate target (X,Y,Z) positions, selecting the most likely grid position by finding the minimizer of (5) or (6) over the grid, and noting the X position of the minimum-cost grid point.

In step 83, the process 90 looks to see if the estimated X position of the tag crosses zero from positive to negative.

In step 84, if a positive-to-negative X crossing was detected, other metrics are computed based on the sequence of received array response vectors, RSSI estimates, and any computed likelihood vs. position estimates up to that point.

The other metrics could include the Y axis position at the time of the X axis zero crossing (which, if the tag went into the monitored room, should be between −1.5 and 1.5 feet for a 3 ft. wide doorway) which could be computed by noting the Y position of the minimum-cost grid point of equation (5) or (6), the elevation angle of the minimum-cost grid point at the time the X axis zero crossing (typically at least 80 degrees for an entry into the monitored room), the average RSSI across all antennas (see equation (2)). Another metric that could be used is a "beam width" metric, which can be defined as the spatial width (in feet) of the region in the beamforming heat map within 1-2 dB of the peak. The beam width can be shown to be typically much smaller when the tag is directly under the monitor vs. elsewhere. Any or all of the metrics computed above could be smoothed over time using a moving average process, a digital lowpass filter or a more sophisticated non-linear filter such as a Kalman or Particle filter.

In step 85, the metrics computed in step 84 are compared against an appropriate set of thresholds to determine if a room entry was made, and if so, the monitor notifies the server of the entry in step 86.

In step 87, the process 90 looks to see if the estimated X position of the tag crosses zero from negative to positive, indicating a possible room exit has occurred. In step 88, if a negative-to-positive X crossing was detected in step 87, other metrics such as Y axis position at the time of X zero crossing, beam width, elevation angle, or RSSI at time of X zero crossing are computed. In step 89, the other metrics computed in step 88 are compared against an appropriate set of thresholds to determine if a room exit was made, and if so, the monitor notifies the server of the exit in step 90.

Figure 14:
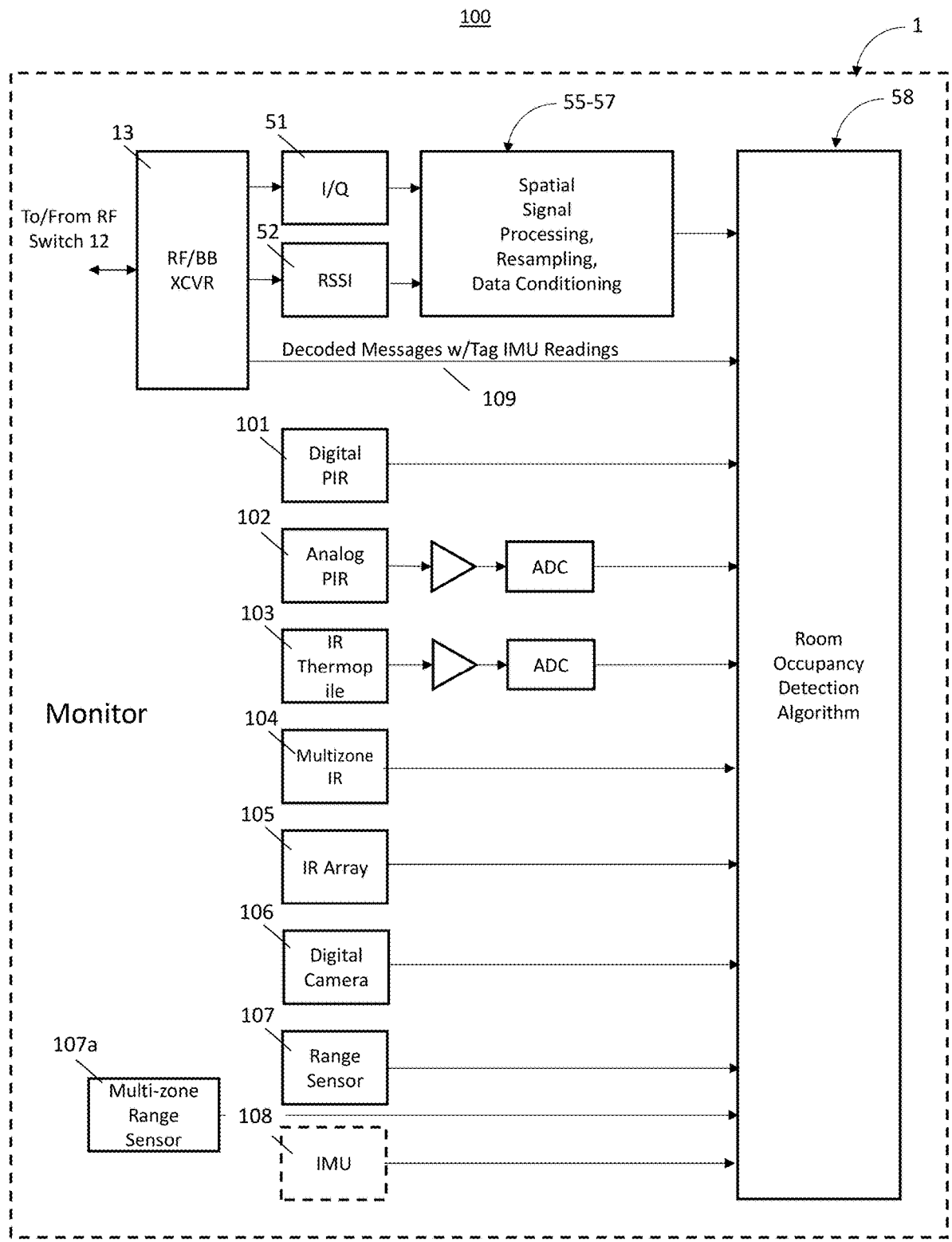
FIG. 14 is a block diagram of a room occupancy monitor with additional sensors to improve detection performance, according to an example embodiment.

Reference is now made to FIG. 14, which shows a functional design 100 of a monitor that is configured to be augmented to support additional sensors. Because of the additional information additional sensors provide about the position and direction of travel of the tag device beyond what is available using only the antenna array 10, these sensors can be used to improve the performance of algorithm 58. The top part of the FIG. 14 shows the RF/Baseband transceiver 13 communicating with RF switch 12 on the RF side, and outputting complex (I/Q) array response vectors 51 and RSSI 52 data to the spatial signal processing 55, resampling 56 and data conditioning 57 blocks on the baseband side. The output from the data conditioning block 57 is presented to the room occupancy detection algorithm 58. This is the data feed that is available to the room occupancy detection algorithm 58 when it uses only the antenna array signals.

The most basic additional sensor signal that could be provided as input to the algorithm is the output from a digital PIR sensor 101. This could be the same physical sensor that is used for the motion sensor 6 described earlier that is used to wake up the processor 15 from sleep. The output of the digital PIR sensor 101 could be sampled by the processor 15 concurrently along with the array response 51 and RSSI 52 signals received from the transceiver 13 and provided as input to the room occupancy detection algorithm 58 along with those signals. The precise timing of the activity of the digital PIR sensor 101, when combined with the I/Q samples 51 and RSSI samples 52 provides additional information that the room occupancy detection algorithm 58 could use to determine the room occupancy state of a tag device. For example, if the motion sensor 6 was triggered because of a person walking around inside the room but not entering or exiting, the timing characteristics of the motion sensor signal may align differently to the position vs. time information carried by the array signals than an actual room entry or exit.

Using an analog PIR 102 or IR thermopile 103 instead of the digital PIR sensor 101 would provide more information to the algorithm since the intensity of the IR signals is available. The intensity of the IR signal indicates how close the target is to the monitor or whether the target is inside the IR sensor's FOV.

Figure 15A:
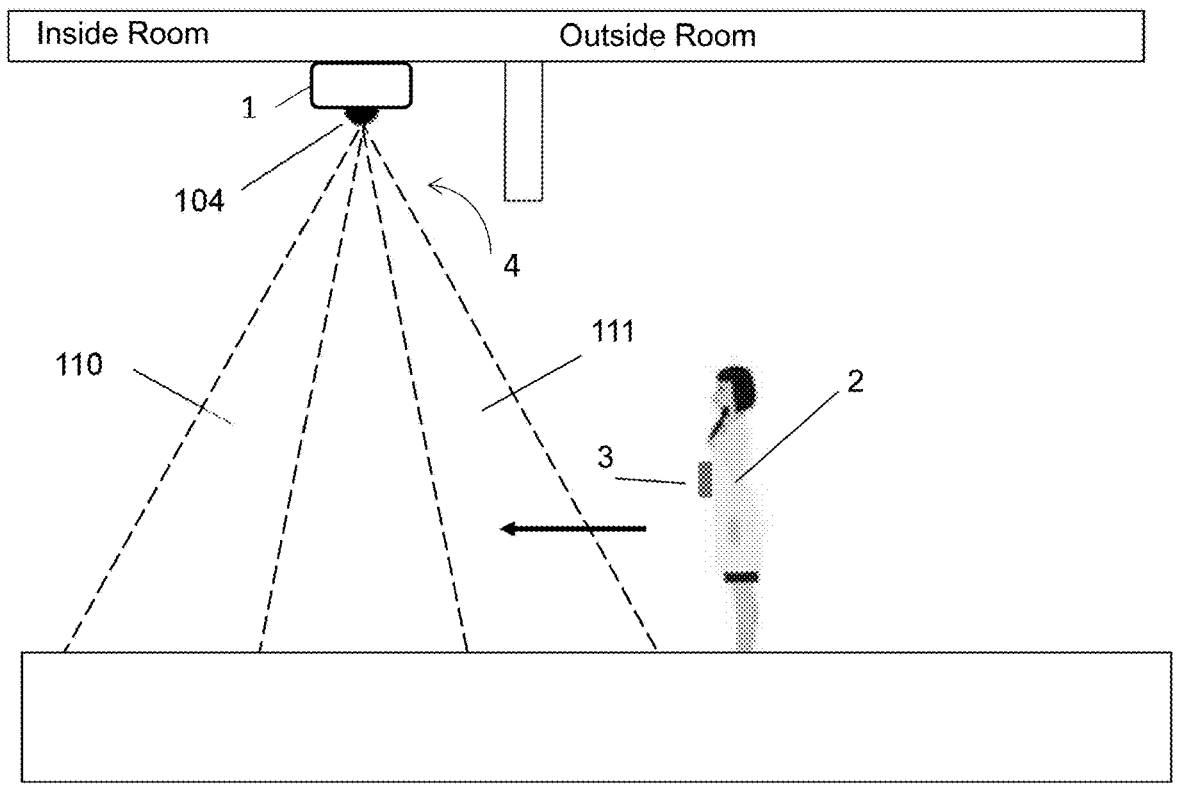
FIG. 15A is an exemplary block diagram showing how a dual-zone infrared (IR) sensor could be used as an additional input signal source of a room occupancy detection monitor, in accordance with one embodiment.
Figure 15B:
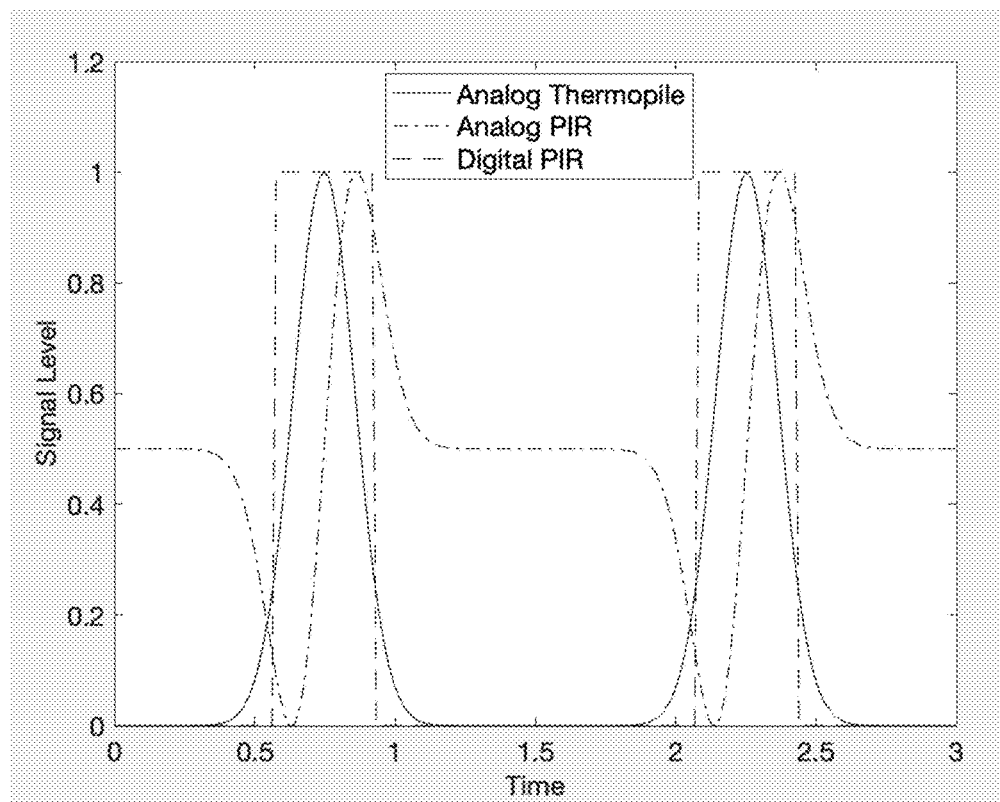
FIG. 15B is an exemplary plot showing the voltage output over time of the dual-zone IR sensor of FIG. 15A as a person walks into a room.

Using two or more PIRs or IR thermopiles would further increase the information content delivered to the room occupancy detection algorithm 58. This is depicted as a multi-zone IR sensor 104 in FIG. 14. The relative timing of the peaks of these two signals can be used to infer a direction of travel for the person wearing or using the tag device. If only one peak is seen, this would suggest that the person that caused the IR activity remained either inside or outside the room and did not enter or exit. The two-zone IR sensor scenario is illustrated in FIGS. 15A and 15B. In this example, one of the two IR sensors in multi-zone IR sensor 104 points inside the room from the monitor while the other points outside. A person 2 wearing a tag device 3 is about to enter the room 4. The plot in FIG. 15B shows a pulse of IR activity at 0.75 seconds as the person walks through outside zone 110, and then another pulse at time 2.2 seconds when the person walks through the inside zone 111.

Referring back to FIG. 14, the highest performance realization of a multi-zone IR sensor is an IR array 105, which could be implemented using either a digital camera with an IR lens and filter, or a thermopile array chip. The use of the array effectively allows the room occupancy detection algorithm 58 to process a sequence of digital thermal images, sampled concurrently with the received array response and RSSI information received from the transceiver 13.

Another alternative sensor that could be deployed on the monitor 1 is a digital camera 106. The digital camera 106 could be used to periodically digitize images in its field of view and provide the digitized images into room occupancy detection algorithm 58 along with the antenna array outputs (I/Q samples 51 and RSSI samples 52). The images could be digitized using either a red-green-blue (RGB) color or black-and-white encoding scheme.

As an alternative to IR-based sensors, laser, radar or ultrasound-based range sensors 107 could be used. One or more of these range sensors 107 could be installed on the monitor 1 and configured to periodically report on the measured distance between the range sensor and the nearest intervening object or person. The distance measurements from either of these sensors could be provided as input into the room occupancy detection algorithm 58 along with the antenna array outputs.

Alternatively, a multi-zone range sensor 107a could be used. The multi-zone range sensor 107a could be configured to report on the measured distance between itself and the nearest intervening object or person within a plurality of angular zones around the sensor 107a. For example, a 4×4 or 8×8 angular grid of zones could be used.

The additional sensors could also be deployed on the tag device 3. A low-cost micro electromechanical system (MEMS) inertial motion unit (IMU) 108 containing a three-axis accelerometer, compass or gyroscope sensor could be installed on the tag device. The tag device could then be configured to periodically digitize the IMU sensor outputs and transmit them over-the-air to the monitor 1. FIG. 14 shows the IMU 108 in dotted line to indicate that the IMU is actually not resident on the monitor 1, but instead is part of the tag device. The monitor 1 could decode the IMU sensor readings 109 and feed them into the room occupancy detection algorithm 58 along with the antenna array outputs. If the Bluetooth™ 5.1 wireless protocol is used, the encoded IMU sensor readings could be included in the same packets containing the CTE that are already being transmitted by the tag.

If the IMU 108 on the tag has a three-axis compass, for that compass to be useful to the monitor 1, the monitor would need to know its own orientation relative to the earth's magnetic north. This could be done as a calibration step after the monitor 1 is first installed, or by installing a 3-axis compass or IMU 108 on the monitor itself. In the latter case, the monitor could measure its own orientation relative to an earth-centered earth-fixed (ECEF) coordinate system, removing the need for a calibration step. Once the monitor knows its own orientation relative to ECEF, the compass readings from the tag could be transformed from ECEF bearings to monitor-based bearings—i.e., directions of travel on the monitor-centric coordinate system describe earlier—before being fed into room occupancy detection algorithm 58.

One additional benefit of having an IMU 108 installed on the tag 3 is that the accelerometer on the IMU could be used as a motion sensor to conserve tag battery life. For example, the tag device could save battery by disabling its transmitter and entering a low power sleep state when no motion has been detected for the past one minute. The tag device could immediately begin transmitting again once motion is detected.

If the room occupancy detection algorithm 58 is a machine learning algorithm, adding one or more additional sensor signals as input to the algorithm is conceptually trivial; one would need to include the additional sensors signals with the antenna array outputs 51 and 52 and re-run the data gathering and training procedure 70 using all the input signals. If the room occupancy detection algorithm 58 is a non-machine learning algorithm, logic and thresholds would need to be added to the algorithm to determine the tag's occupancy status using the additional inputs.

The monitor 1 can be used for other applications in addition to room occupancy detection. For example, the monitor 1 could be used to detect when a wireless tag or badge device 3 enters or exits a multi-zone room containing multiple hospital beds. The monitor 1 could also be used in a single or multi-zone room to determine when a caregiver 2 wearing a wireless tag or badge is at a patient's bedside. Yet another application that will be discussed below is hand hygiene monitoring.

Figure 16:
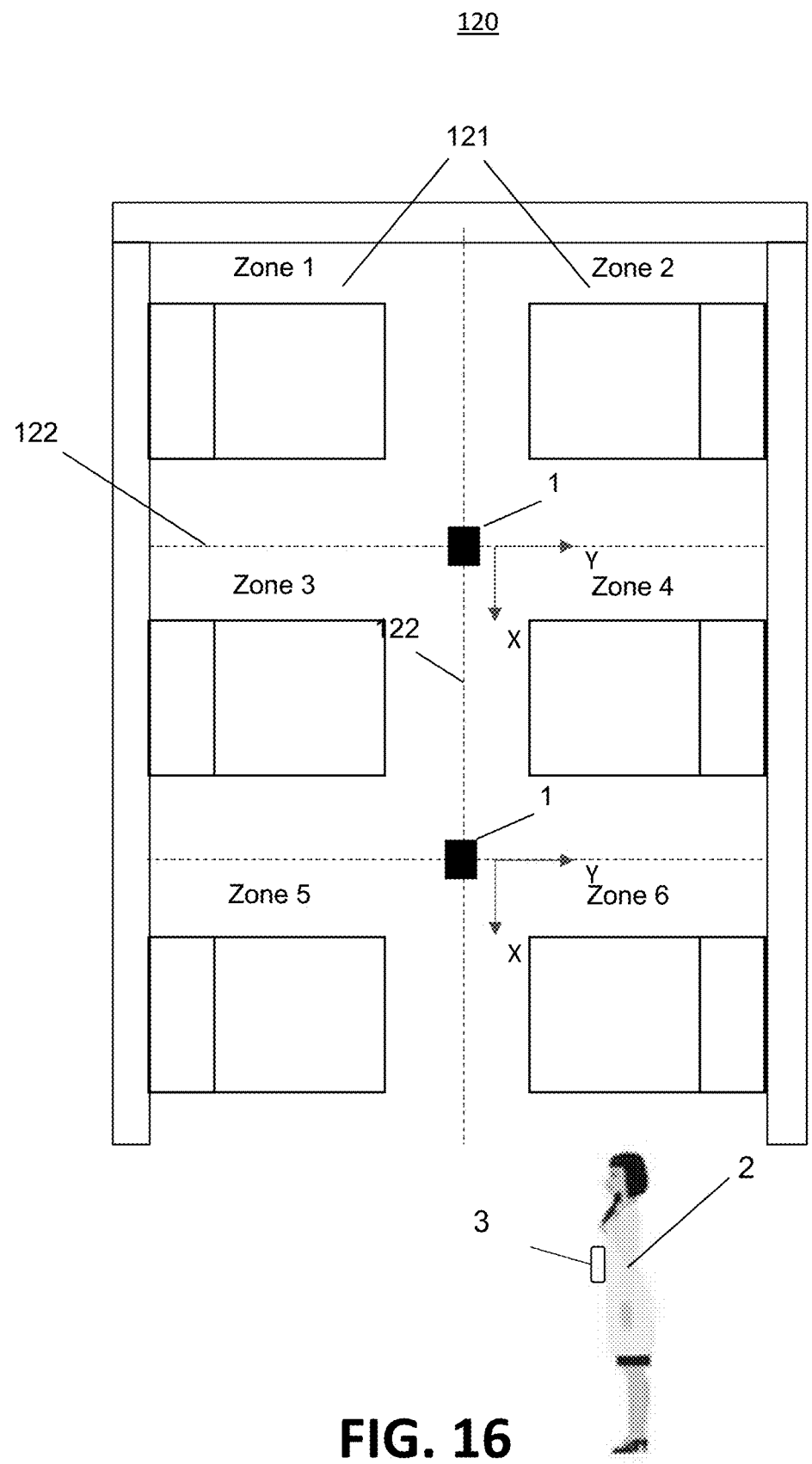
FIG. 16 is a diagram showing an example of how one or more room occupancy monitors may be used to detect zone occupancy of one or more tag devices in a multi-zone room, in accordance with one embodiment.

Reference is now made to FIG. 16, which shows how the monitor 1 could be used in a multi-zone room application. A room 120, such as a hospital intensive care unit (ICU) or emergency room (ER), containing multiple zones 121 to accommodate a plurality of patients is shown. In rooms such as these, multiple monitors 1 could be used to determine within which zone 121 a caregiver 2 or patient wearing a tag device (badge) 3 as an emitter is, at a given time. The monitors 1 may be installed on the ceiling with their antenna arrays pointing straight down, and oriented so that their X and Y axes are parallel to zone boundaries 122. Each monitor may use a PIR with an omni-directional Fresnel lens as its motion sensor to detect motion in any of the monitored zones 121, or near the boundaries 122 between monitored zones. Each time the PIR wakes up the monitor, the processor in the monitor 1 could wake up the transceiver of the monitor to listen for wireless transmissions to determine if any of the monitored emitters 3 has entered or exited any of the zones 121.

Figure 17:
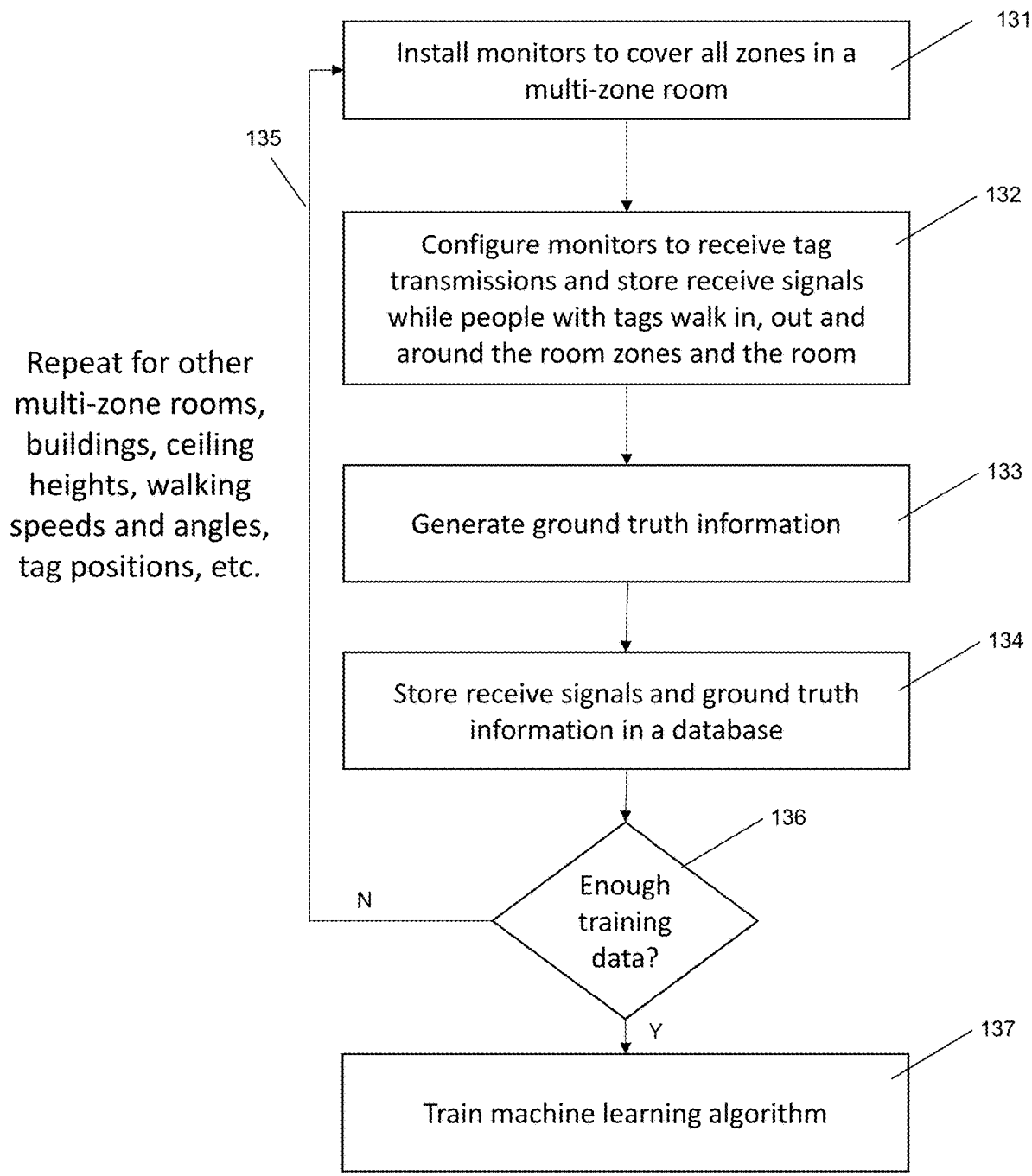
FIG. 17 is a flow chart of a method for training a ML-based zone occupancy detection algorithm for use in multi-zone rooms, in accordance with one embodiment.

To determine when an emitter 3 has entered or exited a zone 121, an algorithm similar to the room occupancy detection algorithm 58, described above, may be used. If a machine learning algorithm is desired, the procedure 130 shown in FIG. 17 may be used to train the algorithm. Reference is now made to FIG. 17, with continued reference to FIG. 16. In step 131, monitors 1 are installed on the ceiling at the midpoint between two or more zones spanning one or more rooms in an area that resembles the environment where the system is intended to be used once in production. Each monitor should be configured to operate just as it would in practice; in particular, the monitor should only wake up from sleep and begin receiving and storing data after it has been woken up by its motion sensor.

In step 132, each of the monitors 1 is configured to receive, downconvert and decode wireless transmissions from one or more tag devices 3 as people 2 wearing, carrying, or moving the tag devices walk into, out of, around the outside and around the inside of the zones 121 in all the monitored rooms 4. The monitors are also configured to generate and record receive signals produced by the one or more monitors for each of the detected wireless transmissions. The receive signals could include the received array response vectors and RSSI estimates for each received transmission from the tag devices 3. The receive signals could also include the results of operations applied to the array response vectors or RSSI information, such as beamforming or MUSC spatial processing. The operations could also include the results of other operations, such as resampling and data conditioning.

In step 133, ground truth information containing the tag device ID, zone ID, monitor ID, entry time and exit time every time a tag or badge device 3 enters or exits a zone is recorded and stored. The ground truth could be obtained by recording a video of the people wearing the tags walking in and out of the monitored rooms and zones in step 132 and later playing back the video to determine with precision when each tag entered or exited each monitored room or zone.

In step 134, the recorded receive signals and ground truth information are stored in a training database.

In step 135, steps 131-134 are repeated at numerous different locations having different ceiling heights, floor layouts and construction materials. The people used to wear, carry or move the tag or badge devices 3 could enter or exit the rooms or zones at different walking speeds and entry/exit angles, and change the way they wear, carry or move the tag or badge to emulate the way the tag device will be used in practice as much as possible.

In step 136, the training procedure in steps 131-135 is terminated when it is determined that a sufficient amount of training data has been taken. This determination is usually made by partitioning the receive signals and ground truth information stored in the database into a training data set and a test data set. There is enough training data when adequate performance is attained on the data set, and the machine learning algorithm performs adequately on the test data set and on data taken from new rooms, zones or buildings. If the algorithm does not perform as well on newly obtained data from a new room, zone, person, tag or environment as it typically does in the test set, this could mean that the algorithm needs to be trained on that new room, zone or environment.

In step 137, once it is determined that a sufficient amount of training data has been obtained and stored in the training database, that data is used to train the machine learning algorithm that runs on the monitor.

Figure 18:
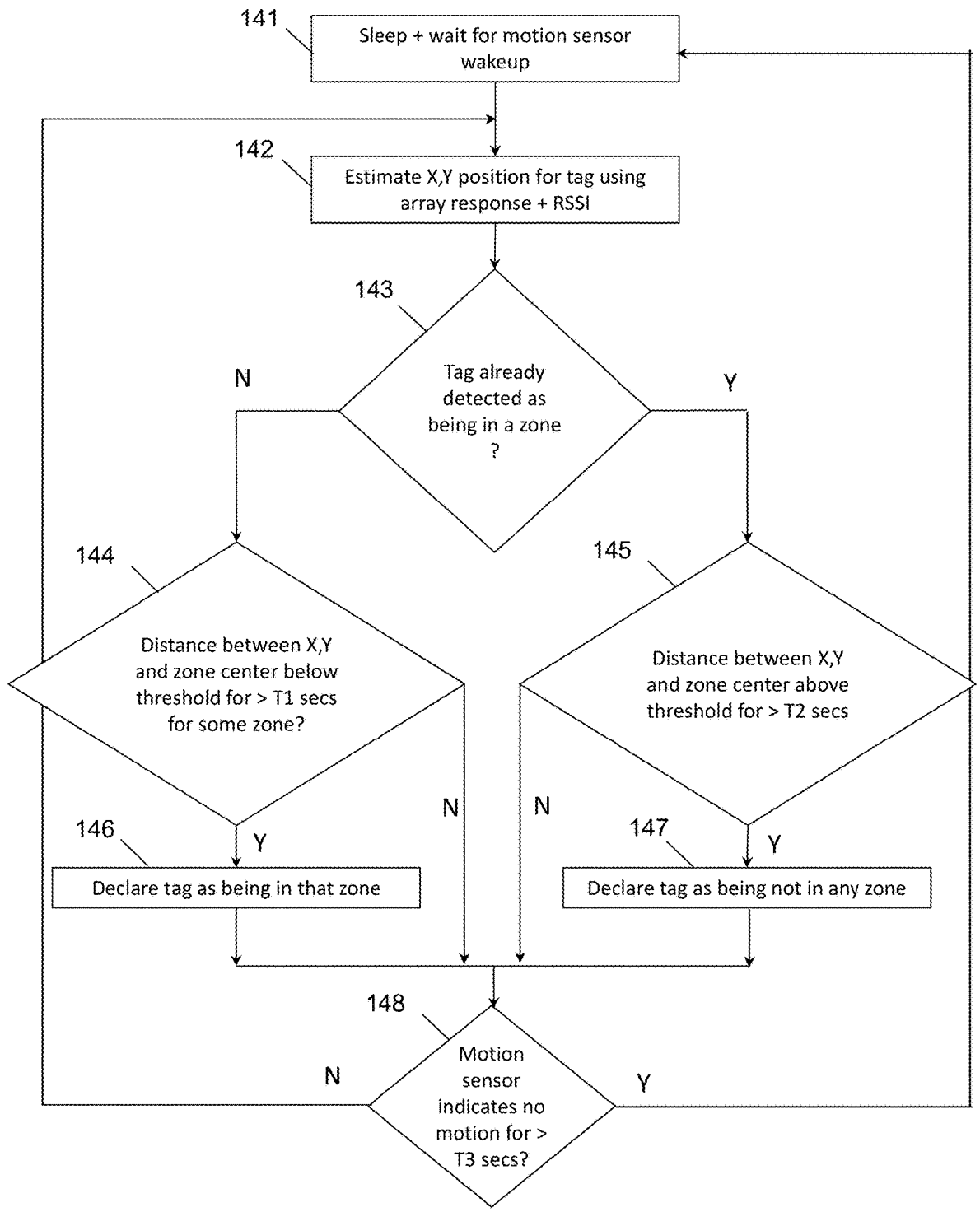
FIG. 18 is a flow chart of a non-ML-based zone occupancy detection algorithm for use in multi-zone rooms, in accordance with one embodiment.

Reference is now made to FIG. 18, which shows a flow chart 140 depicting a non-machine learning approach for zone-based occupancy detection. In step 141, the monitor 1 remains asleep in a low current state until it receives a wake-up signal from its motion sensor. In step 142, once the processor of the monitor wakes up, it wakes up its RF/Baseband transceiver, configuring it to pass the array response and RSSI information received from any tag transmissions up to the processor, and for each array response and RSSI received, estimates the X,Y position of the tag using the monitor-centric rectangular coordinate system defined earlier. The X,Y position of the tag could be estimated by evaluating the beamforming or MUSIC cost functions (5) or (6) over a grid of candidate target (X,Y,Z) positions selecting the most likely grid position by finding the minimizer of (5) or (6) over the grid, and noting the X,Y position of the minimum-cost grid point. To minimize the number of cost function evaluations, the Z component of the tag position could be held at a constant value—e.g., 5 feet, to model a typical height for most adults.

In step 143, the algorithm tests whether the tag has already been detected as being currently in any of the monitored zones.

In step 144, if the tag has not been detected as being in any zone, the algorithm looks to see if the X,Y position of the tag is sufficiently close to any of the zone center positions for some minimum period of time—T1 seconds. In step 146, if the test condition of step 144 is true, the algorithm declares the tag to be inside of the zone at the closest distance to the estimated X,Y position of the tag.

In step 145, if the tag has been detected as being in some zone, the algorithm looks to see if the estimated X,Y position of the tag is too far from the center position of the currently detected zone for some minimum period of time—T2 seconds.

In step 147, if the test condition of step 145 is true, the algorithm declares the tag to be not inside any of the zones.

In step 148, the algorithm tests to see if there has been any motion detected by the motion sensor 6 over some period of time—T3 seconds. If there has not been any motion over the past T3 seconds, the algorithm puts the monitor into a low current sleep state and returns to step 141. Otherwise, if there has been motion detected in the past T3 seconds, the monitor returns to step 142.

Figure 19:
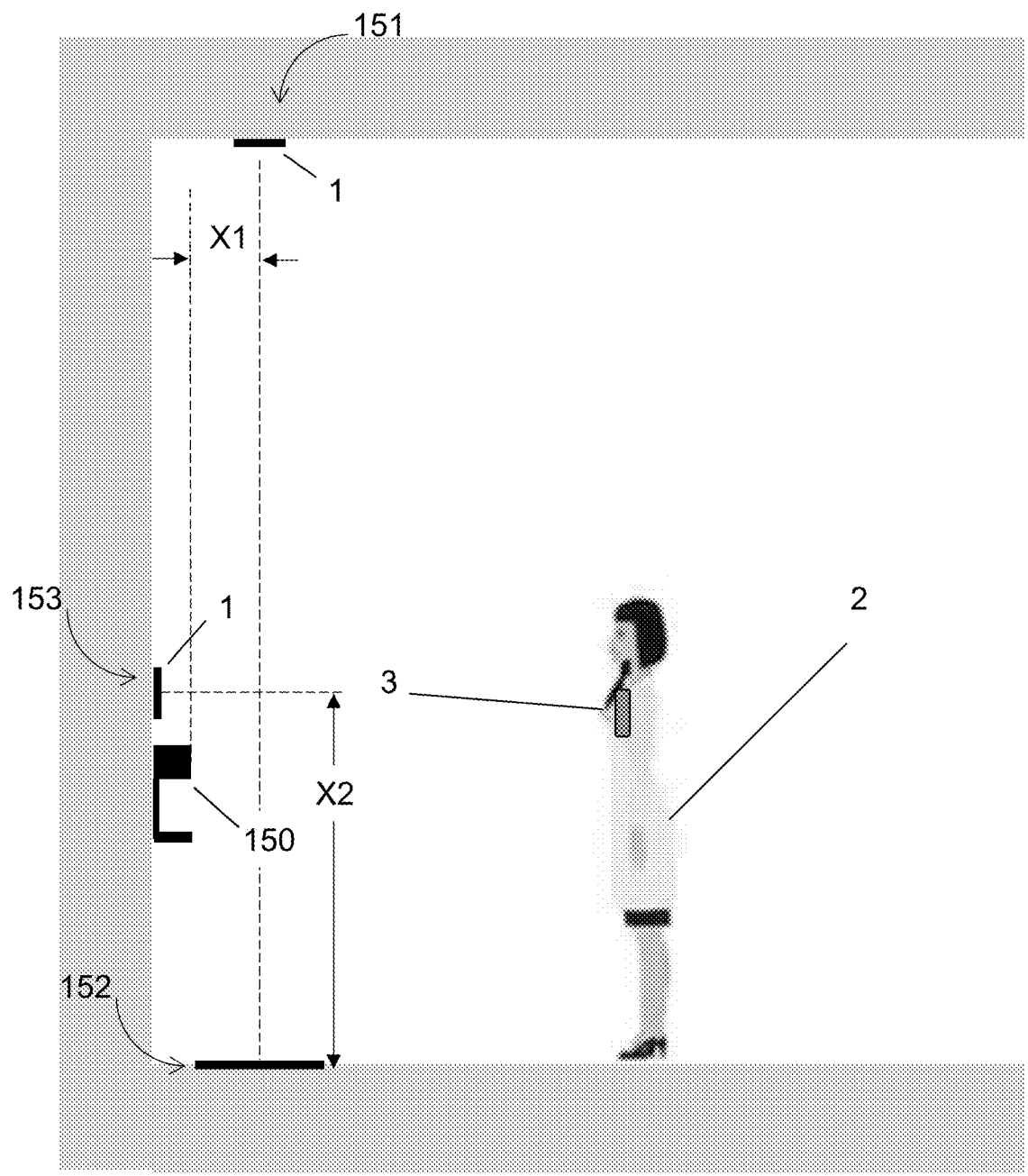
FIG. 19 is a diagram showing an example of how a room occupancy monitor could be used to detect disinfectant dispenser usage in a hand hygiene monitoring application, in accordance with one embodiment.

Reference is now made to FIG. 19, which shows how a monitor 1 could be used for a hand hygiene compliance application. For this application, in addition to being used to detect room or zone entries in a hospital or clinic, the monitor 1 is also installed near (Bluetooth™-enabled) disinfectant dispensers 150 and used to detect when a healthcare provider 2 wearing tag device/badge 3 uses the dispenser 150 to administer disinfectant on their hands.

The monitor 1 could be installed either on the ceiling 151 directly above the place 152 where a person would stand when using the disinfectant dispenser 150, on the wall just above or alongside 153 the dispenser 150 or integrated into the dispenser in some way (the latter is not shown in FIG. 19). An algorithm running on processor of the monitor 1 could be used to determine when a person 2 wearing a Bluetooth™ 5.1 enabled tag device/badge 3 is within a certain distance of the dispenser 150. The dispenser 150 itself could be equipped to send a message to the monitor 1 whenever a dispense has been given. The monitor 1 could note the badge ID of the closest badge to the monitor at the time of the dispense to determine the identity of the person 2 that disinfected their hands.

If the monitor is installed on the ceiling 151, a motion sensor of the monitor with a narrow FOV aiming directly downward from the monitor could be used to wake the monitor from sleep. If the monitor is installed on the wall next to the dispenser, a PIR could still be used to wake up the monitor, a motion sensor with a very short range (e.g., 1-3 feet) may be used to prevent false wakeups caused by people moving more than 3 feet away from the dispenser who are not using it.

Figure 20:
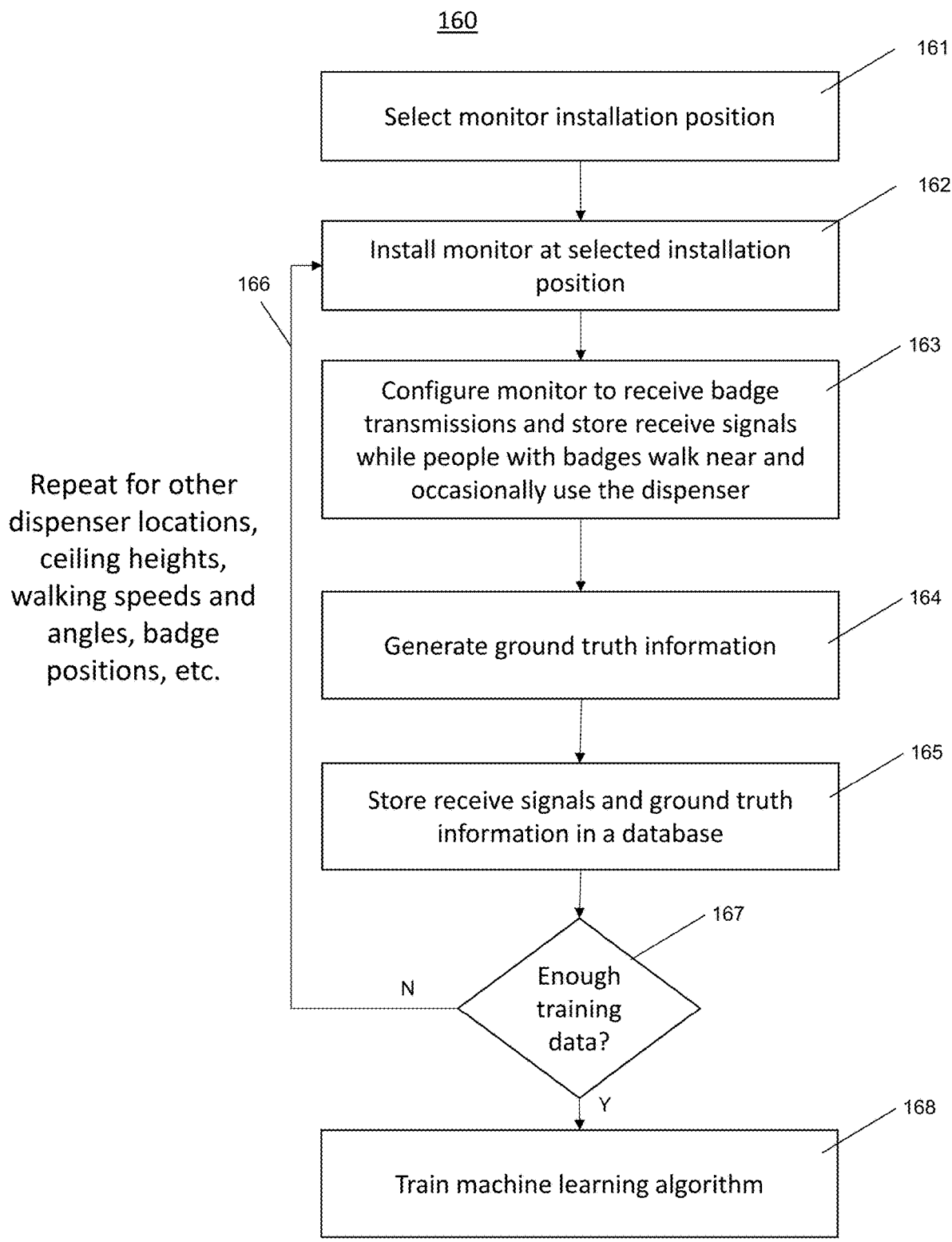
FIG. 20 is a flow chart of a method for training a ML-based disinfectant dispenser usage detection algorithm, in accordance with one embodiment.

For this application, the goal of the software algorithm running on the monitor's processor is to determine with confidence the Bluetooth™ 5.1 badge ID worn by a user 2 of the dispenser 150. If a machine learning algorithm is desired, a procedure 160 for training such an algorithm to determine the user's badge ID after a dispense, may be employed. The procedure 160 is now described with reference to FIG. 20, and continued reference to FIG. 19.

In step 161, the monitor's installation position is selected among options (a), (b) or (c) below: (a) on the ceiling 151, directly above the place 153 a person would stand when using the dispenser 150, with the antenna array 10 center positioned X1 inches in front of the front midpoint of the dispenser 150 for some known parameter X1 that is held constant throughout the entire training procedure 160, (b) on the wall with the antenna array 10 center positioned X2 inches above the floor and X3 inches to the left of the top-center point of the dispenser for some known parameters X2 and X3 that are held constant throughout the entire training procedure 160, wherein using a negative value of X3 means to the right of the dispenser, (c) integrated inside the dispenser.

In step 162, the monitor 1 is installed at the position selected in step 161.

In step 163, the monitor 1 is configured to receive, downconvert and decode wireless transmissions from one or more wireless tag devices/badges 3 as people 2 wearing the badges walk around and occasionally use the dispenser 150. The monitor 1 is also configured to generate and record receive signals associated with each of the detected wireless transmissions. The receive signals could include the received array response vectors and RSSI estimates for each received transmission from the badges. The receive signals could also include the results of operations applied to the array response vectors or RSSI information, such as beamforming or MUSC spatial processing. The operations could also include the results of other operations, such as resampling and data conditioning.

In step 164, ground truth information containing the badge ID of the user 2 and the dispense time each time the dispenser was used is recorded and stored. The ground truth information could be obtained by recording a video of the people using the dispenser in step 163 and later playing back the video to determine with precision when each dispense occurred and what user's badge was associated with each dispense.

In step 165, the recorded receive signals and ground truth information are stored in a training database.

In step 166, steps 162-165 are repeated at numerous different dispenser locations having different ceiling heights, dispenser heights, surrounding wall configurations, and construction materials. The people wearing the badges should attempt to approach and use the dispenser with a broad range of walking speeds, distances to the dispenser, walking angles and people grouping arrangements.

In step 167, the training procedure in steps 161-166 is terminated when it is determined that a sufficient amount of training data has been taken. This determination is usually made by partitioning the receive signals and ground truth information stored in the database into a training data set and a test data set. There is enough training data when adequate performance is attained on the data set, and the machine learning algorithm performs adequately on the test data set and on data taken from new dispenser locations. If the algorithm does not perform as well on newly obtained data from a new dispenser location or use case as it typically location does in the test set, this could mean that the algorithm needs to be trained on that new location or use case.

In step 168, once it is determined that a sufficient amount of training data has been obtained and stored in the training database, that data is used to train the machine learning algorithm.

Figure 21:
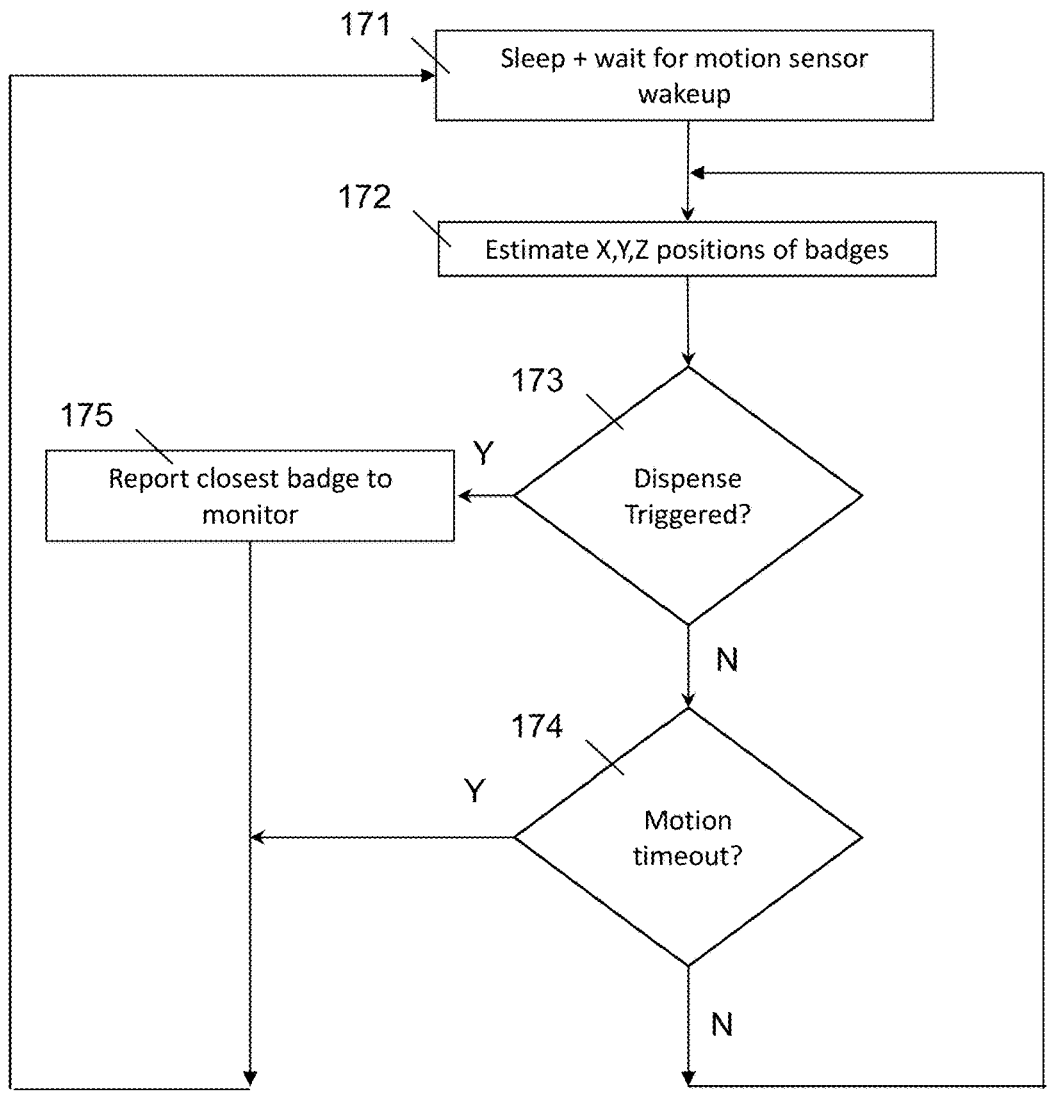
FIG. 21 is a flow chart of a non-ML-based disinfectant dispenser usage detection algorithm, in accordance with one embodiment.

Reference is now made to FIG. 21, which shows a flow chart depicting a non-machine learning procedure 170 for determining the badge ID of a disinfectant dispenser user. Reference is also made to FIG. 19 for purposes of the description of FIG. 21. In step 171, the monitor 1 remains asleep in a low current state until it receives a wake-up signal from its motion sensor. In step 172, once the processor of the monitor wakes up, it wakes up the RF/Baseband transceiver in the monitor in, configuring it to pass the array response and RSSI information received from any badge transmissions up to the processor, and for each array response received, estimates the X, Y, Z position of the badge using the monitor-centric rectangular coordinate system defined earlier herein. The X, Y, Z position of the tag could be estimated by evaluating the beamforming or MUSIC cost functions (5) or (6) over a grid of candidate target (X,Y,Z) positions selecting the most likely grid position by finding the minimizer of (5) or (6) over the grid, and noting the X, Y, Z position of the minimum-cost grid point.

In step 173, the algorithm tests to see whether a disinfectant dispense event has been triggered in the disinfectant dispenser 150, indicating that disinfectant was administered at the dispenser 150. The dispense signal could be received from the disinfectant dispenser 150 via either a hard-wired connection between the dispenser 150 and the monitor 1, or a Bluetooth wireless message sent from the dispenser 150 to the monitor 1. If such a dispense trigger signal was not received by the monitor 1, control proceeds to step 174. If such a dispense trigger signal was received by the monitor 1, then control proceeds to step 175.

In step 174, the processor of the monitor 1 determines how much time has transpired since motion was last detected by the motion sensor of the monitor. If the time since motion was last detected exceeds a timeout period, the processor puts the monitor to sleep by returning to 171. Otherwise, control returns to step 172.

In step 175, the processor of the monitor determines which badge is closest to the monitor 1 at the time the dispense signal was received by looking for the tag which has an (X,Y,Z) position that is closest in Euclidean distance to the (X,Y,Z) position of the monitor 1, and sends a message (e.g., to the server 43 via gateways 41 as depicted in FIG. 7) containing the badge ID of that badge. If two or more badges are determined to be close to the monitor 1 at the time of the dispense, the processor may send a special message to the server 43 via the gateways 41 indicating that this was the case. This would give the server the option of removing this dispense from consideration for hand hygiene monitoring, since there is ambiguity in which user used the dispenser.

It should be noted any of the additional sensors shown in FIG. 14 that could be used as additional inputs to improve the performance of the room occupancy detection algorithm 58, could also be used in much the same way to improve the performance of the multi-zone room occupancy detection and disinfectant dispenser badge ID detection algorithms. For the multi-zone room application, a multi-zone digital or analog PIR signal could be used to detect motion in each room zone and provided as input into the room zone detection algorithm along with the antenna array outputs. The same is true of an IR array 105 or a digital camera 106, multi-zone range sensor 107*a* or an IMU 108 on the tag device 3. For the disinfectant dispenser application, the digital or analog PIR sensor, IR array 105, multi-zone range sensor 107*a* or digital camera 106, or IMU on the tag device 3 could be used to help detect the presence of the dispenser user as well. For the dispenser application, the dispenser output signal itself (signaling when the disinfectant was administered from the dispenser) could be provided as an additional input to the badge ID detection algorithm.

Some variants of the Room Occupancy detection algorithm 58 can be quite computationally expensive. For example, some large neural networks are known to require on the order of 50 MFLOPS to process the received array response information from a single tag device. In an operational setting such as a hospital nursing unit, it is not unreasonable to require a single monitor to service up to 50 tag devices at the same time. If the same 50 MFLOPS per tag neural network is used, then 50*50=2.5 GFLOPS are required to support all 50 tags. This amount of processing throughput will have a significantly detrimental impact on the monitor's manufacturing cost and battery life.

Figure 22:
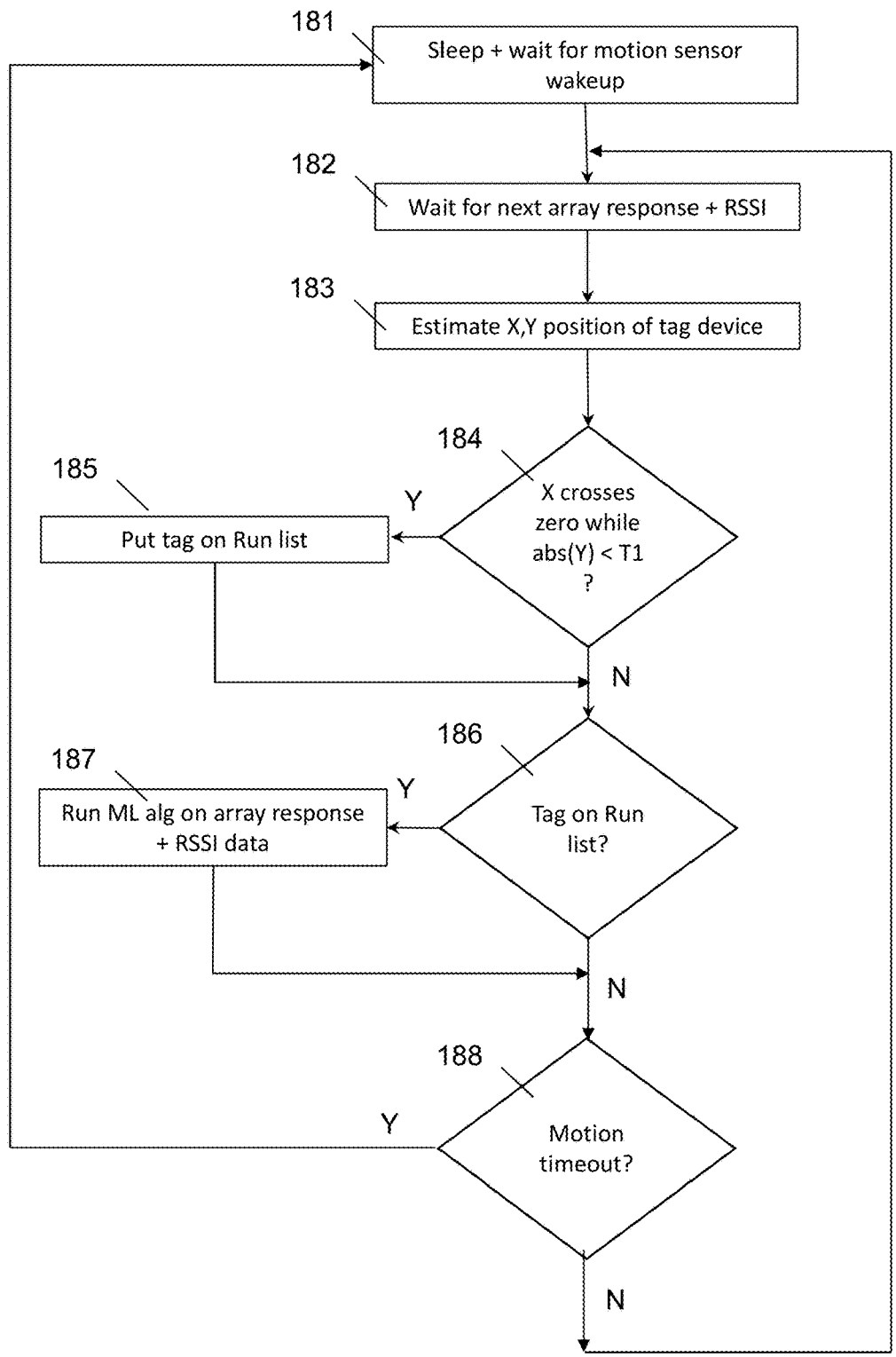
FIG. 22 is flow chart of a computationally efficient method for winnowing tag devices before running a more computationally intensive room occupancy detection algorithm, according to an example embodiment.

Reference is now made to FIG. 22, which shows a computationally efficient winnowing procedure 180 for identifying a subset of wireless tag devices which are reasonably likely to enter or exit a monitored room or zone. The winnowing procedure 180 can be shown to require much less than 50 MFLOPS per tag to identify likely entry or exit candidates. It is reasonable to expect procedure 180 to require 0.1 MFLOPS or less per tag. For example, if the winnowing procedure 180 runs on a monitor 1 that services 50 tag devices and can winnow from 50 to 5 the tags on which to run a 50 MFLOPS per tag neural network, this reduces the peak computational load from 2.5 GFLOPS to 5*50+45*0.1=0.26 GFLOPS.

In step 181 of procedure 180, the monitor 1 remains asleep in a low current state until it receives a wake-up signal from its motion sensor.

In step 182, once the processor of the monitor wakes up, it wakes up the RF/Baseband transceiver, configuring it to pass the array response and RSSI information received from any tag transmissions up to the processor, and waits for an array response vector and RSSI measurement to be received.

In step 183, the processor of the monitor estimates the X,Y position of the tag using the received array response vector and RSSI measurement. The X,Y position is calculated using the monitor-centric rectangular coordinate system defined earlier herein. The X,Y position of the tag could be estimated by evaluating the beamforming or MUSIC cost functions (5) or (6) over a grid of candidate target (X,Y,Z) positions selecting the most likely grid position by finding the minimizer of (5) or (6) over the grid, and noting the X,Y position of the minimum-cost grid point. To minimize the number of cost function evaluations over the (X,Y,Z) grid, the Z component of the tag position could be held at a constant value—e.g., 5 feet over this grid, to model a typical height for most adults.

In step 184, the processor tests to see if the X position signal for the tag device has changed sign while the absolute value of the Y position estimate is smaller than a threshold of T1 feet. If the test condition is true, then at 185, the processor puts the tag device on a "Run" list.

In step 186, the processor tests to see if the tag is on the Run list. If it is, then at 187, the room occupancy algorithm 58 is run on the current array response signal and all the array response information received from this tag device since the sleep wakeup of step 182.

In step 188, the processor tests to see if more than T2 seconds have transpired since motion was last detected via the motion sensor 6, where T2 is an appropriate timeout duration—for example, 5 seconds. If so, the processor removes all tag devices from the Run list and goes to sleep. Otherwise, the processor proceeds back to step 182.

The concepts described above herein describe a system in which the tag device 3 is configured as a wireless emitter, the monitor device is configured as a receiver wherein the monitor device 1 receives transmissions from the emitter on multiple receive antennas and uses observed phase differences on the receive antennas to determine the position of the tag device using angle-of-arrival techniques. It should be noted that because of the laws of physics regarding antenna reciprocity, any of these approaches could instead be implemented using the monitor 1 as the emitter, the tag device as the receiver, wherein the monitor sends the transmit signal on multiple antennas (in sequence), and wherein the tag receives the transmissions on a single antenna, computes phase differences from the receive signals, and uses the computed phase differences to determine the tag's position relative to the monitor. In the latter case, the room occupancy detection algorithm 58 would run on the tag instead of the monitor since the tag is where the phase differences are computed and readily available. Such a room occupancy detection system would include one or more one or more room beacons/transmitters configured to send a transmit signal (on a repetitive continuous basis, for example) from multiple antennas (in a sequential manner via one of the antennas at a time), and one or more tag devices each configured to receive the transmissions (on a single antenna) and compute phrase differences from receive signals derived from receiving the transmissions from the room beacon(s). The tag device uses the computed phase differences to determine its position relative to the room beacon(s)/transmitter(s). Again the room occupancy detection algorithm would run on the tag devices instead of on the room monitor. A server may be provided that is configured to receive the room occupancy detection events from the one or more tag devices. In this system, each of the one or more room occupancy beacons/transmitters includes an antenna array or a plurality of antennas from which to transmit signals; a wireless transmitter configured to generate transmissions to be transmitted via the plurality of antennas (in a sequential manner via one of the antennas at a time). Each tag device may include a wireless receiver to produce receive signals from reception of the transmissions from a room beacon/transmitter, a processor configured to process the receive signals and to run an algorithm on a sequence of received signal strength estimates and array response vectors derived from the receive signals to determine the tag device has entered or exited a room via the entryway to the room.

Operational Efficiencies Based on Room Entryway Orientation

Figure 23:
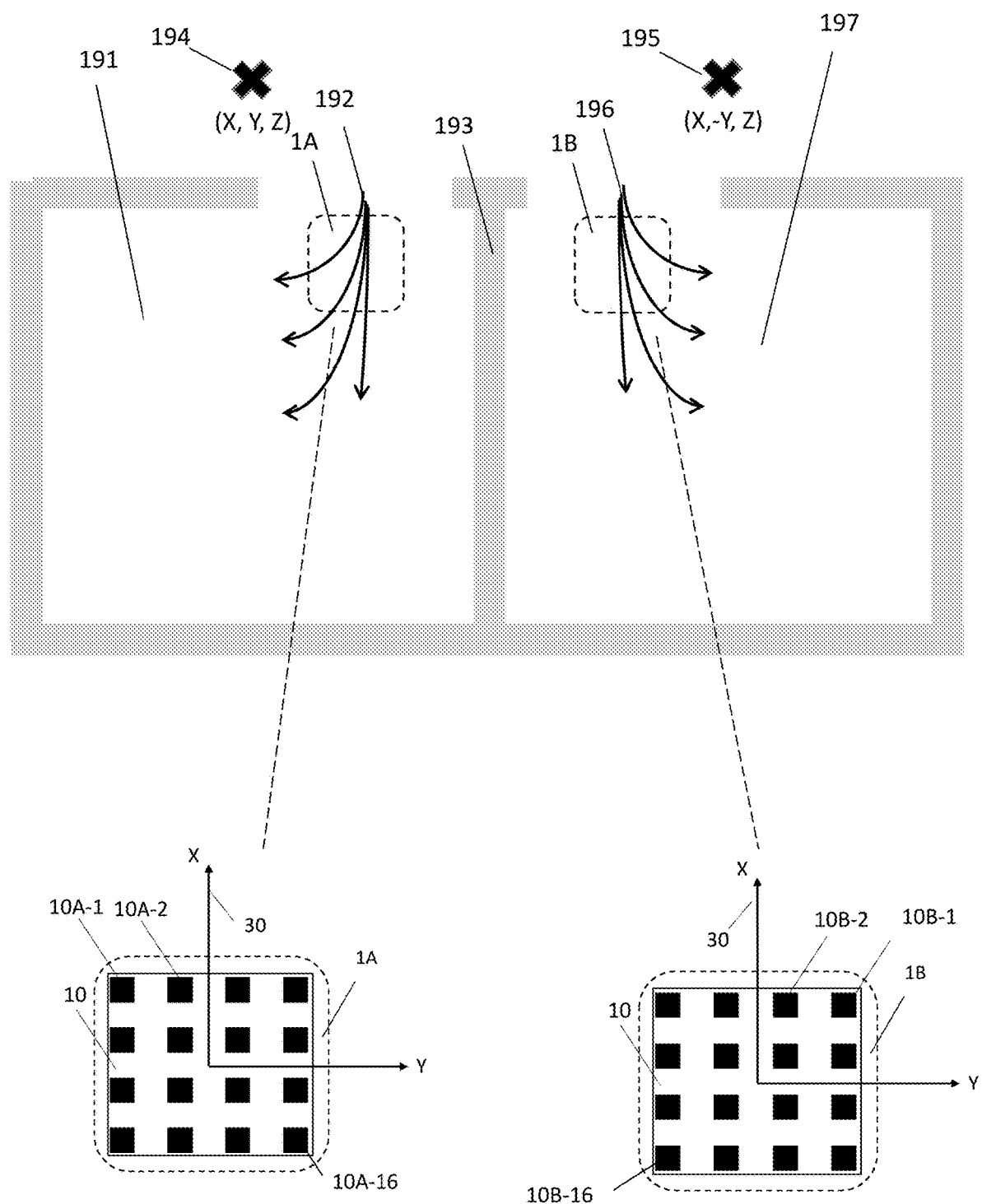
FIG. 23 is a diagram showing differences in how the room occupancy monitor behaves in rooms that open to the left or right, according to an example embodiment.

Reference is now made to FIG. 23, which shows an example scenario in which monitors are installed in left and right opening rooms. It is well known that most rooms in an office or healthcare environment have an entryway near either side of the room, but rarely in the middle of the room. Nearly half of these rooms open to the right as shown in right-opening room 191 when facing into the room from outside, the other nearly half open to the left as shown in left-opening room 197, and a much smaller portion of the rooms have the entryway at or near the midpoint between the side walls of the room. The set of valid entry paths 192 for people walking into the room 191 that opens to the right excludes paths that go to the left because the intervening wall 193 blocks travel in that direction. And the valid entry paths 196 into the room 197 that opens to the left exclude paths that go to the right for the same reason. Statistically speaking, the entry paths 192, 196 for rooms that open to the right and left tend to be mirror images of one another, with the plane of the wall 193 being their axis of symmetry.

The fact that the entryway paths vary depending on the room entryway orientation poses both an opportunity and a logistical challenge for the room occupancy detection algorithm 58. When installing the room occupancy monitor, the installer could specify as a system configuration parameter whether the room opens to the left, right, or middle, and this selection can be presented as input to the room occupancy detection algorithm 58 to improve its performance by taking advantage of the known differences among their walking path statistics. The logistical challenge comes from the additional data gathering that needs to take place to develop (if a non-ML algorithm is used) or train (if a ML algorithm is used) and test the room occupancy detection algorithm 58 for the three different room types, since training and testing the algorithm on the three different room types requires approximately three times more data than for a single room type.

It is possible to avoid the need to gather extra data by exploiting the inherent symmetries among the three different room entryway orientations. First, assuming a noise-free and multipath-free RF environment, it can be shown that the array response vector zA received by a monitor 1A installed in a right-opening room 191 from an emitter positioned at a point (X,Y,Z) 194 relative to that monitor is identical to the response vector zB received by a monitor 1B installed in a left-opening room 197 from an emitter positioned at the mirror image point (X,-Y,Z) 195 relative to monitor 1B—provided that the antennas in monitor 1B are re-numbered so as to make them function as if they were transposed about the monitor's X axis relative to the monitor 1A numbering. The antennas on the right-opening monitor 1A are labeled 10A-1, 10A-2, . . . 10A-16 in FIG. 23, those on the left-facing monitor 1B are labeled—after transposing—10B-1, 10B-2, . . . , 10B-16.

The array transpose operation can be implemented in software by exchanging any readings taken from antennas on one side of the X axis with the readings from the antennas at the mirror image positions on the other side of the array's X axis. So, given an array response vector z with component readings {z1, z2, . . . , z16} taken from antennas 10A-1, 10A-2, . . . , 10A-16, respectively, the array transpose operation is implemented as follows:

components z1, z5, z9 and z13 are exchanged with z4, z8, z12, and z16, components z2, z6, z10 and z14 are exchanged with z3, z7, z11, and z15.

To summarize, the vector {z1, z2, . . . , z16} would map to {z4, z3, z2, z1, z8, z7, z6, z5. z12. z11, z10, z9, z16, z15, z14, z13} after transposing.

Thus, it is possible to make array response data obtained from any left (right) opening room appear as if it was obtained from a right (left) opening room by re-arranging the array response vectors from the left (right) facing room using the array transpose operation described above. By the time the data gets to room occupancy detection algorithm 58, it will appear as if all rooms opened in the same direction. This approach can be applied to not only rectangular antenna arrays, but any array that has symmetry about the X axis 30.

Referring back to FIGS. 3 and 12, the data gathering, training and test procedure 70 can be modified as follows so that only data from left or right opening rooms is needed for training the room occupancy detection algorithm 58 to detect room occupancy for left, right or middle opening rooms, without any requirement being placed on the relative proportions of left, right or middle opening rooms.

In step 74, before storing the receive signals in the database, the array transpose operation may be applied to the receive signals taken from left (or right) opening rooms to make it appear to the room occupancy detection algorithm 58 during training or testing as if all rooms opened to the right (or left).

An alternative to applying the array transpose operation before storing the receive signals as described above would be to include a left-right indication—an indication as to whether each room opens to the left or right—in the ground truth information stored in step 74, and transpose the receive signals before presenting them to the room occupancy detection algorithm 58 during training step 77 or testing based on the left-right indication.

In step 75, the installation, data gathering ground truth generation and storage steps 71-74 can be repeated for any number of rooms that either open to the left or to the right, without regard to the relative numbers of left or right opening rooms. Middle-opening rooms, however, should not be used as part of this procedure per se.

Since the algorithm running on the monitors would be trained to detect entries into left (or right) opening rooms but not both, the array transpose operation should be used by processor 15 to transpose the array response vectors before presenting them to the room occupancy detection algorithm 58 whenever the monitor is installed in a right (or left) opening room.

To train the room occupancy detection algorithm 58 to detect entries or exits into middle-opening rooms, step 77 may be modified to randomly transpose the receive signals to simulate a left-opening room half of the time, and a right-opening room the other half of the time. For middle opening rooms, the monitor should not be configured to transpose the array response vectors.

Figure 24:
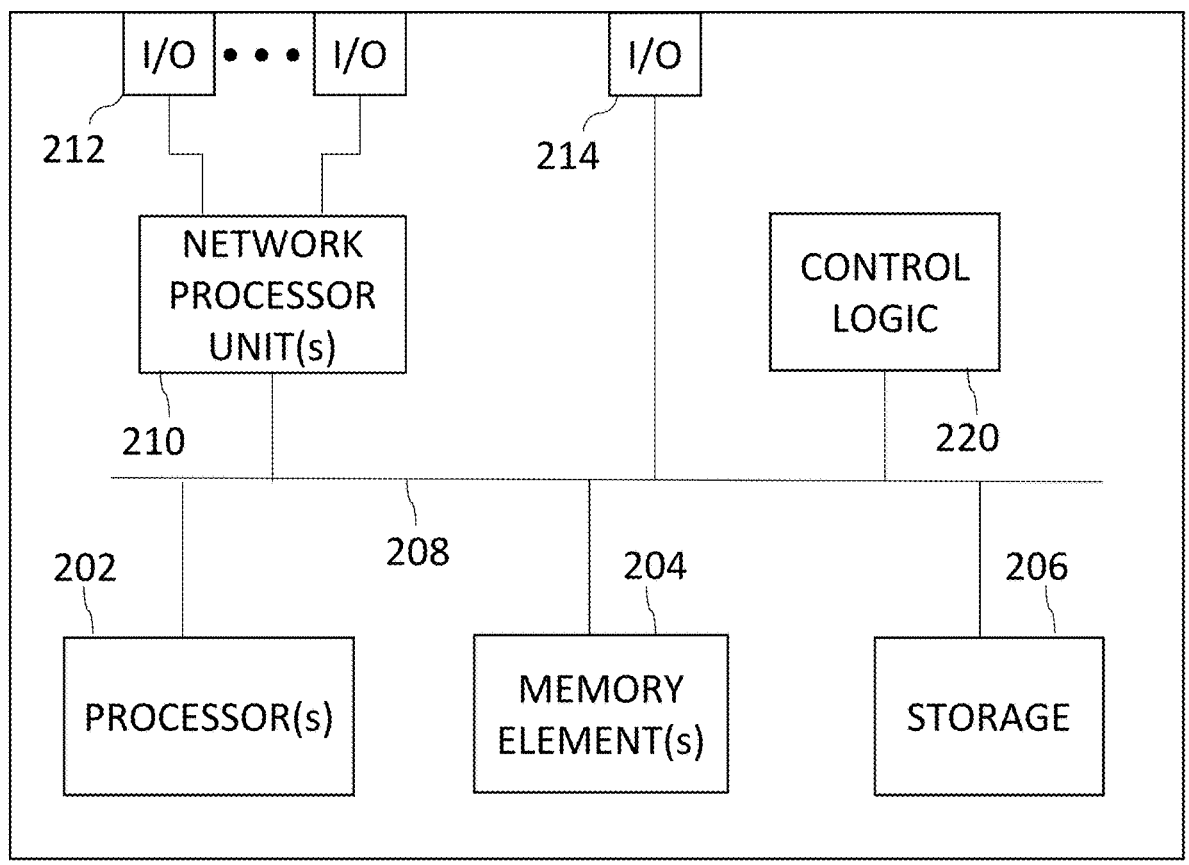
FIG. 24 illustrates a hardware block diagram of a computing device that may perform functions associated with various operations described herein, according to an example embodiment.

Referring to FIG. 24, FIG. 24 illustrates a hardware block diagram of a computing device 200 that may perform functions associated with operations discussed herein in connection with the techniques depicted in FIGS. 1-23. In various embodiments, a computing device or apparatus, such as computing device 200 or any combination of computing devices 200, may be configured as any entity/entities (e.g., servers 43 and/or 45 described above) as discussed for the techniques depicted in connection with FIGS. 1-23 in order to perform operations of the various techniques discussed herein.

In at least one embodiment, the computing device 200 may be any apparatus that may include one or more processor(s) 202, one or more memory element(s) 204, storage 206, a bus 208, one or more network processor unit(s) 210 interconnected with one or more network input/output (I/O) interface(s) 212, one or more I/O interface(s) 214, and control logic 220. In various embodiments, instructions associated with logic for computing device 200 can overlap in any manner and are not limited to the specific allocation of instructions and/or operations described herein.

In at least one embodiment, processor(s) 202 is/are at least one hardware processor configured to execute various tasks, operations and/or functions for computing device 200 as described herein according to software and/or instructions configured for computing device 200. Processor(s) 202 (e.g., a hardware processor) can execute any type of instructions associated with data to achieve the operations detailed herein. In one example, processor(s) 202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 204 and/or storage 206 is/are configured to store data, information, software, and/or instructions associated with computing device 200, and/or logic configured for memory element(s) 204 and/or storage 206. For example, any logic described herein (e.g., control logic 220) can, in various embodiments, be stored for computing device 200 using any combination of memory element(s) 204 and/or storage 206. Note that in some embodiments, storage 206 can be consolidated with memory element(s) 204 (or vice versa), or can overlap/exist in any other suitable manner.

In at least one embodiment, bus 208 can be configured as an interface that enables one or more elements of computing device 200 to communicate in order to exchange information and/or data. Bus 208 can be implemented with any architecture designed for passing control, data and/or information between processors, memory elements/storage, peripheral devices, and/or any other hardware and/or software components that may be configured for computing device 200. In at least one embodiment, bus 208 may be implemented as a fast kernel-hosted interconnect, potentially using shared memory between processes (e.g., logic), which can enable efficient communication paths between the processes.

In various embodiments, network processor unit(s) 210 may enable communication between computing device 200 and other systems, entities, etc., via network I/O interface(s) 212 (wired and/or wireless) to facilitate operations discussed for various embodiments described herein. In various embodiments, network processor unit(s) 210 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 200 and other systems, entities, etc. to facilitate operations for various embodiments described herein. In various embodiments, network I/O interface(s) 212 can be configured as one or more Ethernet port(s), Fibre Channel ports, any other I/O port(s), and/or antenna(s)/antenna array(s) now known or hereafter developed. Thus, the network processor unit(s) 210 and/or network I/O interface(s) 212 may include suitable interfaces for receiving, transmitting, and/or otherwise communicating data and/or information in a network environment.

I/O interface(s) 214 allow for input and output of data and/or information with other entities that may be connected to computing device 200. For example, I/O interface(s) 214 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 220 can include instructions that, when executed, cause processor(s) 202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 204 and/or storage 206 can store data, software, code, instructions (e.g., processor instructions), logic, parameters, combinations thereof, and/or the like used for operations described herein. This includes memory element(s) 204 and/or storage 206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun.

In some aspects, the techniques described herein relate to a wireless room occupancy monitor, including: an antenna array configured to detect wireless transmissions from a tag device; a wireless transceiver configured to receive the wireless transmissions detected by the antenna array and produce receive signals; a processor configured to process the receive signals; and a motion sensor coupled to the processor and configured to wake up the processor in response to detecting when the tag device enters or exits a room; wherein the antenna array and motion sensor are configured to be mounted proximate (e.g., on a ceiling of the room, just inside) an entryway to the room; and wherein after the motion sensor wakes up the processor, the processor is configured to power on the wireless transceiver and run an algorithm on a sequence of received signal strength estimates and array response vectors derived from the receive signals to determine when the tag device has entered or exited the room via the entryway.

In some aspects, the techniques described herein relate to a room occupancy monitor, further including a power supply configured to power the room occupancy monitor, the power supply including one of: a battery or group of batteries, a power-over-Ethernet interface, or a DC power supply interface.

In some aspects, the techniques described herein relate to a room occupancy monitor, wherein the algorithm operates on either the sequence of received signal strength estimates and array response vectors directly, or on an output of an operation applied to the sequence of received signal strength estimates and array response vectors.

In some aspects, the techniques described herein relate to a room occupancy monitor, wherein the operation is a spatial beamforming operation or a multiple signal classification (MUSIC) spatial analysis, yielding a sequence of likelihood vs. position vectors that are provided as an input into the algorithm, wherein each likelihood vs. position vector contains likelihood versus position information about a location of the tag device over a two or three-dimensional set of spatial grid points relative to the antenna array.

In some aspects, the techniques described herein relate to a room occupancy monitor, wherein the algorithm is a machine learning algorithm that uses any one of the following techniques: Decision Trees, Support Vector Machines, K Nearest Neighbors, Naïve Bayes Classifier, Logistic Regression, K-means, Random Forest, Discriminant Analysis, Neural Network, Recurrent Neural Network, Long-Short Term Memory Neural Network, Gated Recurrent Unit Neural Network or Convolutional Neural Network.

In some aspects, the techniques described herein relate to a room occupancy monitor, wherein before running the algorithm, a winnowing procedure is used on the processor to identify a subset of tag devices that are likely to have entered or exited the room, and wherein only receive data obtained from tag devices in the subset of tag devices is processed using the algorithm.

In some aspects, the techniques described herein relate to a room occupancy monitor, wherein the motion sensor is a passive infrared sensor with a narrow field of view spanning a width of the entryway and extending less than two feet inside or outside of the room.

In some aspects, the techniques described herein relate to a room occupancy monitor, further including an analog-to-digital converter configured to digitize an output of the motion sensor that is provided as an input to the algorithm along with the sequence of received signal strength estimates and array response vectors.

In some aspects, the techniques described herein relate to a room occupancy monitor, further including one or more heat, light or proximity sensors including: a single or multi-zone thermopile or thermopile array; a single or multi-zone passive infrared motion sensor; a digital camera; a digital infrared camera; a laser, an ultrasound or a radar proximity sensor; wherein outputs from the one or more heat, light or proximity sensors are digitized and provided as inputs into the algorithm along with the sequence of received signal strength estimates and array response vectors.

In some aspects, the techniques described herein relate to a room occupancy monitor, wherein the array response vectors are re-arranged based on a left-right room opening indication to make it appear as if antennas in the antenna array were transposed about an axis of symmetry running perpendicular to a plane of the entryway.

In some aspects, the techniques described herein relate to a room occupancy detection system, including: one or more room occupancy monitors configured to detect entries into a room and exits from the room of one or more tag devices, and to produce room occupancy detection events; and a server configured to receive the room occupancy detection events from the one or more room occupancy monitors; wherein each of the one or more room occupancy monitors includes: an antenna array configured to detect wireless transmissions from the one or more tag devices; a wireless transceiver configured to receive the wireless transmissions detected by the antenna array and produce receive signals; a processor configured to process the receive signals; and a motion sensor coupled to the processor and configured to wake up the processor in response to detecting when one of the one or more tag devices enters or exits the room; wherein each of the one or more room occupancy monitors is configured to be mounted proximate (e.g., on a ceiling of the room, just inside) an entryway to the room; and wherein after the motion sensor wakes up the processor on any one of the one or more room occupancy monitors, the processor is configured to power on the wireless transceiver and run an algorithm on a sequence of received signal strength estimates and array response vectors derived from the receive signals to determine when one of the one or more tag devices has entered or exited the room via the entryway.

In some aspects, the techniques described herein relate to a system, wherein the room occupancy detection events sent from the one or more room occupancy monitors to the server include a confidence metric, and wherein when the Server receives room occupancy detection events from a plurality of room occupancy monitors for the same tag device within a period of time, the server uses the confidence metric to decide which of the plurality of room occupancy monitors detected a valid room entry.

In some aspects, the techniques described herein relate to a system, wherein the processor of the one or more of the room occupancy monitors is configured to decode inertial motion sensor data contained in the wireless transmissions received from one or more tag devices to produce decoded inertial sensor data, and provides the decoded inertial sensor data into the algorithm along with the sequence of received signal strength estimates and array response vectors.

In some aspects, the techniques described herein relate to a system, wherein the one or more room occupancy monitors include a multi-axis accelerometer or a multi-axis compass, and wherein the processor of a respective room occupancy monitor is configured to determine a spatial orientation of the respective room occupancy monitor relative to the one or more tag devices.

In some aspects, the techniques described herein relate to a method for training a machine learning algorithm for room occupancy monitoring, including: storing receive signals produced by one or more room occupancy monitors as one or more tag devices enter into and exit one or more rooms, wherein the one or more room occupancy monitors are installed on a ceiling inside an entry of each of the one or more rooms, and wherein each of the one or more room occupancy monitors produces the receive signals from wireless transmissions from the one or more tag devices detected by an antenna array of the one or more room occupancy monitors; generating ground truth information including a time when each of one or more persons or machines wearing, carrying or using one or more of the tag devices entered or exited a room of the one or more rooms, an identity of the one or more tag devices that entered or exited the room of the one or more rooms, and the identity of each room occupancy monitor that detected one or more tag devices entering or existing the room of the one or more rooms; and providing the ground truth information and data descriptive of the receive signals to a machine learning algorithm to train the machine learning algorithm to detect room entries or exits using the ground truth information and the receive signals.

In some aspects, the techniques described herein relate to a method, wherein the storing further includes decoding and storing inertial motion sensor data contained in the wireless transmissions received from the one or more tag devices, and the providing further includes providing stored inertial motion sensor data to train the machine learning algorithm to detect room entries or exits using the stored inertial motion sensor data in addition to the ground truth information and the receive signals.

In some aspects, the techniques described herein relate to a method, wherein the storing further includes storing proximity sensor output data from one or more heat, light or proximity sensors including: a single or multi-zone thermopile or thermopile array; a single or multi-zone passive infrared motion sensor; a digital camera; a digital infrared camera; a laser, an ultrasound or a radar proximity sensor, and wherein the providing further includes providing proximity sensor output data from the one or more heat light or proximity sensors to train the machine learning algorithm to detect room entries or exits using the proximity sensor output data from the one or more heat light or proximity sensors in addition to the ground truth information and the receive signals.

In some aspects, the techniques described herein relate to a method, further including: receiving room occupancy detection events sent from the one or more room occupancy monitors at a server, wherein the room occupancy detection events each include a confidence metric, and wherein when the server receives the room occupancy detection events from a plurality of room occupancy monitors for the same tag device within a period of time, the server uses the confidence metric to make disambiguation decisions to determine which of the plurality of room occupancy monitors detected a valid room entry; wherein the generating further involves including the disambiguation decisions in the ground truth information.

In some aspects, the techniques described herein relate to a method, wherein the storing further includes re-arranging the receive signals based on a left-right room opening indication before they are stored to make it appear as if antennas in the antenna array were transposed about an axis of symmetry running perpendicular to a plane of an entryway of each of the one or more rooms.

In some aspects, the techniques described herein relate to a method, wherein the ground truth information further includes a left-right room opening indication for each of the one or more rooms, and wherein the receive signals received from the antenna array are rearranged based on the left-right room opening indication to make it appear as if antennas in the antenna array were transposed about an axis of symmetry running perpendicular to a plane of an entryway of each of the one or more rooms.

In some aspects, the techniques described herein relate to a wireless hand disinfectant dispenser, comprising: a reservoir containing hand disinfectant; a pump configured to deliver hand disinfectant from the reservoir onto the hands of a disinfectant user and generate usage events; an antenna array configured to detect wireless transmissions from one or more tag devices; a wireless transceiver configured to receive the wireless transmissions detected by the antenna array and produce receive signals; a processor coupled to the pump and the wireless transceiver and configured to process the receive signals and usage events; a motion sensor coupled to the processor and configured to wake up the processor in response to detecting when a person is within a certain distance of the hand disinfectant dispenser; wherein after the motion sensor wakes up the processor, the processor is configured to power on the wireless transceiver and begin storing a sequence of received signal strength estimates and array response vectors derived from the receive signals; and wherein each time the pump generates a usage event, the processor is configured to power on the wireless transceiver and run an algorithm on the stored sequence to determine an identity of the dispenser user and a level of confidence in the identity.

In some aspects, the techniques presented herein relate to a wireless hand disinfectant delivery system, comprising: a hand disinfectant dispenser coupled to the processor configured to generate usage events; an antenna array configured to detect wireless transmissions from one or more tag devices; a wireless transceiver configured to receive the wireless transmissions detected by the antenna array and produce receive signals; a processor coupled to the wireless transceiver and the hand disinfectant dispenser configured to process the receive signals and usage events; a motion sensor coupled to the processor and configured to wake up the processor in response to detecting when a person is within a certain distance of the hand disinfectant dispenser; wherein after the motion sensor wakes up the processor, the processor is configured to power on the wireless transceiver and begin storing a sequence of received signal strength estimates and array response vectors derived from the receive signals; and wherein each time the pump generates a usage event, the processor is configured to power on the wireless transceiver and run an algorithm on the stored sequence to determine an identity of the dispenser user and a level of confidence in the identity.

In some aspects, the techniques presented herein relate to a wireless zone occupancy monitor, comprising: an antenna array configured to detect wireless transmissions from a tag device; a wireless transceiver configured to receive the wireless transmissions detected by the antenna array and produce receive signals; a processor configured to process the receive signals; and a motion sensor coupled to the processor and configured to wake up the processor in response to detecting when the tag device enters or exits a zone; wherein the antenna array and motion sensor are configured to be mounted proximate (e.g., on a ceiling of a room, at) a place of intersection among multiple zones inside the room; and wherein after the motion sensor wakes up the processor, the processor is configured to power on the wireless transceiver and run an algorithm on a sequence of received signal strength estimates and array response vectors derived from the receive signals to determine when the tag device has entered or exited a zone inside the room.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A wireless room occupancy monitor, comprising:
   an antenna array configured to detect wireless transmissions from a tag device;
   a wireless transceiver configured to receive the wireless transmissions detected by the antenna array and produce receive signals;
   a processor configured to process the receive signals; and
   a motion sensor coupled to the processor and configured to wake up the processor in response to detecting when the tag device enters or exits a room;
   wherein the antenna array and motion sensor are configured to be mounted proximate an entryway to the room; and
   wherein after the motion sensor wakes up the processor, the processor is configured to power on the wireless transceiver and run an algorithm on a sequence of received signal strength estimates and array response vectors derived from the receive signals to determine when the tag device has entered or exited the room via the entryway.

2. The room occupancy monitor of claim 1, further comprising a power supply configured to power the room occupancy monitor, the power supply comprising one of: a battery or group of batteries, a power-over-Ethernet interface, or a DC power supply interface.

3. The room occupancy monitor of claim 1, wherein the algorithm operates on either the sequence of received signal strength estimates and array response vectors directly, or on an output of an operation applied to the sequence of received signal strength estimates and array response vectors.

4. The room occupancy monitor of claim 3, wherein the operation is a spatial beamforming operation or a multiple signal classification (MUSIC) spatial analysis, yielding a sequence of likelihood vs. position vectors that are provided as an input into the algorithm, wherein each likelihood vs. position vector contains likelihood versus position information about a location of the tag device over a two or three-dimensional set of spatial grid points relative to the antenna array.

5. The room occupancy monitor of claim 3, wherein the algorithm is a machine learning algorithm that uses any one of the following techniques: Decision Trees, Support Vector Machines, K Nearest Neighbors, Naïve Bayes Classifier, Logistic Regression, K-means, Random Forest, Discriminant Analysis, Neural Network, Recurrent Neural Network, Long-Short Term Memory Neural Network, Gated Recurrent Unit Neural Network or Convolutional Neural Network.

6. The room occupancy monitor of claim 1, wherein before running the algorithm, a winnowing procedure is used on the processor to identify a subset of tag devices that are likely to have entered or exited the room, and wherein only receive data obtained from tag devices in the subset of tag devices is processed using the algorithm.

7. The room occupancy monitor of claim 1, wherein the motion sensor is a passive infrared sensor with a narrow field of view spanning a width of the entryway and extending less than two feet inside or outside of the room.

8. The room occupancy monitor of claim 1, further comprising an analog-to-digital converter configured to digitize an output of the motion sensor that is provided as an input to the algorithm along with the sequence of received signal strength estimates and array response vectors.

9. The room occupancy monitor of claim 1, further comprising one or more heat, light or proximity sensors including: a single or multi-zone thermopile or thermopile array; a single or multi-zone passive infrared motion sensor;

a digital camera; a digital infrared camera; a laser, an ultrasound or a radar proximity sensor, wherein outputs from the one or more heat, light or proximity sensors are digitized and provided as inputs into the algorithm along with the sequence of received signal strength estimates and array response vectors.

10. The room occupancy monitor of claim 1, wherein the array response vectors are re-arranged based on a left-right room opening indication to make it appear as if antennas in the antenna array were transposed about an axis of symmetry running perpendicular to a plane of the entryway.

11. A room occupancy detection system, comprising:
one or more room occupancy monitors configured to detect entries into a room and exits from the room of one or more tag devices, and to produce room occupancy detection events; and
a server configured to receive the room occupancy detection events from the one or more room occupancy monitors;
wherein each of the one or more room occupancy monitors comprises:
an antenna array configured to detect wireless transmissions from the one or more tag devices;
a wireless transceiver configured to receive the wireless transmissions detected by the antenna array and produce receive signals;
a processor configured to process the receive signals; and
a motion sensor coupled to the processor and configured to wake up the processor in response to detecting when one of the one or more tag devices enters or exits the room;
wherein each of the one or more room occupancy monitors is configured to be mounted proximate an entryway to the room; and
wherein after the motion sensor wakes up the processor on any one of the one or more room occupancy monitors, the processor is configured to power on the wireless transceiver and to run an algorithm on a sequence of received signal strength estimates and array response vectors derived from the receive signals to determine when one of the one or more tag devices has entered or exited the room via the entryway.

12. The system of claim 11, wherein the room occupancy detection events sent from the one or more room occupancy monitors to the server include a confidence metric, and wherein when the Server receives room occupancy detection events from a plurality of room occupancy monitors for the same tag device within a period of time, the server uses the confidence metric to decide which of the plurality of room occupancy monitors detected a valid room entry.

13. The system of claim 11, wherein the processor of the one or more of the room occupancy monitors is configured to decode inertial motion sensor data contained in the wireless transmissions received from one or more tag devices to produce decoded inertial sensor data, and provides the decoded inertial sensor data into the algorithm along with the sequence of received signal strength estimates and array response vectors.

14. The system of claim 13, wherein the one or more room occupancy monitors include a multi-axis accelerometer or a multi-axis compass, and wherein the processor of a respective room occupancy monitor is configured to determine a spatial orientation of the respective room occupancy monitor relative to the one or more tag devices.

15. A method performed by a wireless room occupancy monitor, comprising:
detecting, with an antenna array mounted proximate to an entryway to a room, wireless transmissions from a tag device;
producing receive signals with a wireless receiver based on the wireless transmissions detected by the antenna array;
waking up a processor of the wireless room occupancy monitor in response to a motion sensor, mounted proximate the entryway to the room, detecting when the tag device enters or exits the room; and
after the motion sensor wakes up the processor, powering on the wireless receiver and running an algorithm on a sequence of received signal strength estimates and array response vectors derived from the receive signals to determine when the tag device has entered or exited the room via the entryway.

16. The method of claim 15, wherein the algorithm operates on either the sequence of received signal strength estimates and array response vectors directly, or on an output of an operation applied to the sequence of received signal strength estimates and array response vectors.

17. The method of claim 16, wherein the operation is a spatial beamforming operation or a multiple signal classification (MUSIC) spatial analysis, yielding a sequence of likelihood vs. position vectors that are provided as an input into the algorithm, wherein each likelihood vs. position vector contains likelihood versus position information about a location of the tag device over a two or three-dimensional set of spatial grid points relative to the antenna array.

18. The method of claim 16, wherein the algorithm is a machine learning algorithm that uses any one of the following techniques: Decision Trees, Support Vector Machines, K Nearest Neighbors, Naïve Bayes Classifier, Logistic Regression, K-means, Random Forest, Discriminant Analysis, Neural Network, Recurrent Neural Network, Long-Short Term Memory Neural Network, Gated Recurrent Unit Neural Network or Convolutional Neural Network.

19. The method of claim 15, wherein before running the algorithm, further comprising: applying a winnowing procedure on the processor to identify a subset of tag devices that are likely to have entered or exited the room, and wherein only receive data obtained from tag devices in the subset of tag devices is processed using the algorithm.

20. The method of claim 15, wherein the array response vectors are re-arranged based on a left-right room opening indication to make it appear as if antennas in the antenna array were transposed about an axis of symmetry running perpendicular to a plane of the entryway.

* * * * *